United States Patent
Ishioka et al.

(10) Patent No.: US 7,281,054 B2
(45) Date of Patent: Oct. 9, 2007

(54) CONTENTS DISTRIBUTION METHOD, CONTENTS INFORMATION PROCESSING DEVICE, AND COMPUTER PRODUCT

(75) Inventors: Taisuke Ishioka, Kawasaki (JP); Yuji Matsuzaki, Kawasaki (JP); Atsushi Nishide, Kawasaki (JP); Yu Minakuchi, Kawasaki (JP); Shigeki Moride, Kawasaki (JP); Takayuki Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 10/095,083

(22) Filed: Mar. 12, 2002

(65) Prior Publication Data
US 2003/0023757 A1    Jan. 30, 2003

(30) Foreign Application Priority Data
Jul. 13, 2001    (JP) ............................ 2001-214461

(51) Int. Cl.
G06F 15/16    (2006.01)
(52) U.S. Cl. ....................... 709/231; 709/203; 709/219
(58) Field of Classification Search ........ 709/201–203, 709/217–219, 231, 232
See application file for complete search history.

(56) References Cited

U.S. PATENT DOCUMENTS

| | | | | |
|---|---|---|---|---|
| 5,553,221 | A * | 9/1996 | Reimer et al. ............... | 715/720 |
| 5,781,730 | A * | 7/1998 | Reimer et al. ............... | 709/203 |
| 6,237,022 | B1 * | 5/2001 | Bruck et al. ................. | 709/201 |
| 6,351,467 | B1 * | 2/2002 | Dillon ......................... | 370/432 |
| 6,356,879 | B2 * | 3/2002 | Aggarwal et al. ............ | 705/26 |
| 6,389,467 | B1 * | 5/2002 | Eyal ............................ | 709/223 |
| 6,411,724 | B1 * | 6/2002 | Vaithilingam et al. ...... | 382/100 |
| 6,438,579 | B1 * | 8/2002 | Hosken ....................... | 709/203 |
| 6,484,199 | B2 * | 11/2002 | Eyal ............................ | 709/223 |
| 6,502,137 | B1 * | 12/2002 | Peterson et al. ............ | 709/229 |
| 6,535,881 | B1 * | 3/2003 | Baclawski ................... | 707/10 |
| 6,546,185 | B1 * | 4/2003 | Kim et al. ................... | 386/46 |

(Continued)

FOREIGN PATENT DOCUMENTS

JP    6-197342    7/1994

(Continued)

OTHER PUBLICATIONS

Little, T.D.C.; Ahanger, G.; Folz, R.J.; Gibbon, J.F.; Reeve, F.W.; Shelleng, D.H.; and Venkatesh, D., "A Digital On-Demand Video Service Supporting Content-Based Queries," Proceedings of the First ACM International Conference on Multimedia, ACM Press, Sep. 1993, 9 pages.*

(Continued)

Primary Examiner—Bunjob Jaroenchonwanit
Assistant Examiner—Victor Lesniewski
(74) Attorney, Agent, or Firm—Staas & Halsey LLP

(57) ABSTRACT

A system of the present invention is structured based on a connection between an information distributing unit that processes distributed contents information and a client unit of a user via a network such that they can communicate with each other. The contents information selected based on profile information of the user is transmitted from the information distributing unit to the client unit. The system makes the user input evaluation information relating to the evaluation of the transmitted contents information. The contents information to be distributed to the user is changed based on the input evaluation information.

15 Claims, 16 Drawing Sheets

U.S. PATENT DOCUMENTS

| | | | |
|---|---|---|---|
| 6,557,042 B1 * | 4/2003 | He et al. | 709/231 |
| 6,601,103 B1 * | 7/2003 | Goldschmidt Iki et al. | 709/231 |
| 6,769,028 B1 * | 7/2004 | Sass et al. | 709/231 |
| 6,859,799 B1 * | 2/2005 | Yuen | 707/3 |
| 6,941,324 B2 * | 9/2005 | Plastina et al. | 707/104.1 |
| 6,965,770 B2 * | 11/2005 | Walsh et al. | 455/426.1 |
| 6,965,968 B1 * | 11/2005 | Touboul | 711/118 |
| 7,073,129 B1 * | 7/2006 | Robarts et al. | 715/740 |
| 7,113,983 B1 * | 9/2006 | Terada et al. | 709/219 |
| 2003/0126227 A1 * | 7/2003 | Zimmerman et al. | 709/217 |
| 2004/0003096 A1 * | 1/2004 | Willis | 709/228 |

FOREIGN PATENT DOCUMENTS

| | | |
|---|---|---|
| JP | 9-46689 | 2/1997 |
| JP | 10-254850 | 9/1998 |
| JP | 11-18113 | 1/1999 |
| JP | 11-261908 | 9/1999 |
| JP | 2000-23112 | 1/2000 |
| JP | 2000-48046 | 2/2000 |
| JP | 2000-99525 | 4/2000 |
| JP | 2000-293526 | 10/2000 |
| JP | 2000-298662 | 10/2000 |
| JP | 2001-160069 | 6/2001 |
| JP | 2001-160072 | 6/2001 |
| JP | 2001-184371 | 7/2001 |

OTHER PUBLICATIONS

Candan, K. Selcuk; Golshani, Forouzan; Panchanathan, Sethuraman; and Park, Youngchoon, "VIMOS: A Video Mosaic for Spatio-Temporal Representation of Visual Information," 1998 IEEE Southwest Symposium on Image Analysis and Interpretation, Apr. 5-7, 1998, pp. 6-11.*

Satoh, Shin'ichi, "Towards Actor/Actress Identification in Drama Videos," Proceedings of the Seventh ACM International Conference on Multimedia (Part 2), ACM Press, Oct. 1999, pp. 75-78.*

Moriyama, Tsuyoshi; and Sakauchi, Masao, "Video Summarisation Based on the Psychological Content in the Track Structure," Proceedings of the 2000 ACM Workshops on Multimedia, ACM Press, Nov. 2000, pp. 191-194.*

Nock, H.J.; Iyengar, G.; and Neti, C., "Assessing Face and Speech Consistency for Monologue Detection in Video," Proceedings of the Tenth ACM International Conference on Multimedia, ACM Press, Dec. 2002, pp. 303-306.*

Japanese Office Action, mailed Oct. 17, 2006, and issued in priority Japanese Patent Application No. 2001-214461.

* cited by examiner

FIG.10 (RE-EDIT DISTRIBUTION PROCESSING)

EXAMPLE OF OBJECT MODE

EXAMPLE OF INCREASE IN PREFERENCE
POINT OF HIGH-ORDER CATEGORY

CONTENTS DISTRIBUTION METHOD, CONTENTS INFORMATION PROCESSING DEVICE, AND COMPUTER PRODUCT

FIELD OF THE INVENTION

The present invention relates to a method of distributing contents to users according to their preferences, a computer program for executing the method on a, computer, and a contents information processing device.

BACKGROUND OF THE INVENTION

In recent years, a technique called streaming has been developed as a broadcasting technique in the Internet and Intranets. When this streaming technique is utilized, it is not necessary to download all data from a server to a client in order to reproduce contents of images and sound. A client can reproduce images and sound while receiving data from the server.

As protocols of the streaming, there have been generally used RTSP (real-time streaming protocol), RTCP (real-time transport control protocol), and RTP (real-time transport protocol). When these protocols are utilized, it becomes possible to feed back request actions of a client to a server. Therefore, it is usually possible to provide a client with functions of a reproduction, a stopping, a fast forwarding, and a rewinding of video contents.

In general, video contents that are distributed from a server to a client are edited with a video editing system. The contents are edited to meet an object of the contents, by manually connecting various scenes and short scenes of moving pictures that have been picked up with a camera.

The video contents that have been prepared in this way are distributed from the broadcasting side (the server) to clients (users) in time series, usually under the environments of ground-wave broadcasting, satellite broadcasting, cable television (CATV), and the Internet.

However, in order to provide information contents that meet various preferences of individuals, it is necessary to prepare many contents. This has a problem in that the communication cost to prepare and distribute the contents becomes very expensive.

On the other hand, each user must read many information contents from among a large number of contents, in order to select information contents in which the user has interest. Therefore, this has a problem in that it takes excessive time and work for the selection.

As explained above, conventional systems have had various problems. As a result, these conventional systems have been very inconvenient and inefficient both for the readers and providers of the contents.

SUMMARY OF THE INVENTION

It is an object of the present invention to provide a contents distribution method, a contents information processing device, and a computer program which make it possible to efficiently and automatically generate video contents to meet the preferences of users, re-edit video contents to meet feedback from users, and distribute the contents in real time.

The contents distribution method according to one aspect of the present invention is executed by using a contents information management system that is structured based on a connection between a contents information processing device that processes distributed contents information and an information terminal unit of a user via a network such that they can communicate with each other. The contents distribution method comprises a contents information transmission of transmitting the contents information selected based on profile information of the user, from the contents information processing device to the information terminal unit, an evaluation information input step of making the user input evaluation information relating to the evaluation of the contents information that has been transmitted at the contents information transmission step, in the information terminal unit, and a contents information changing step of changing the contents information to be distributed to the information terminal unit of the user, based on the evaluation information that has been input at the evaluation information input step.

The contents information processing device according to another aspect of the present invention is connected to an information terminal unit of a user via a network, and that processes contents information that is distributed to the information terminal unit. The contents information processing device comprises a contents information transmitting unit that transmits the contents information selected based on profile information of the user, to the information terminal unit, an evaluation information receiving unit that receives from the information terminal unit, evaluation information relating to the user evaluation of the contents information that has been transmitted by the contents information transmitting unit, and a contents information changing unit that changes the contents information to be distributed to the information terminal unit of the user, based on the evaluation information that has been received by the evaluation information receiving unit.

The computer program according to still another object of the present invention realizes the contents information processing method on a computer.

Other objects and features of this invention will become apparent from the following description with reference to the accompanying drawings.

DETAILED DESCRIPTIONS

Embodiments of the contents distribution method, the contents information processing device, and the computer program relating to the present invention will be explained in detail below while referring to the accompanying drawings. It should be noted that the present invention is not limited to these embodiments.

Particularly, in the following embodiments, the present invention will be explained based on examples that are suitable for application to a streaming broadcasting under the Internet environment. However, the application is not limited to this instance, and it is also possible to apply the present invention to the ground-wave broadcasting, the satellite broadcasting, and the CTAV, in a similar manner.

Figure 1:
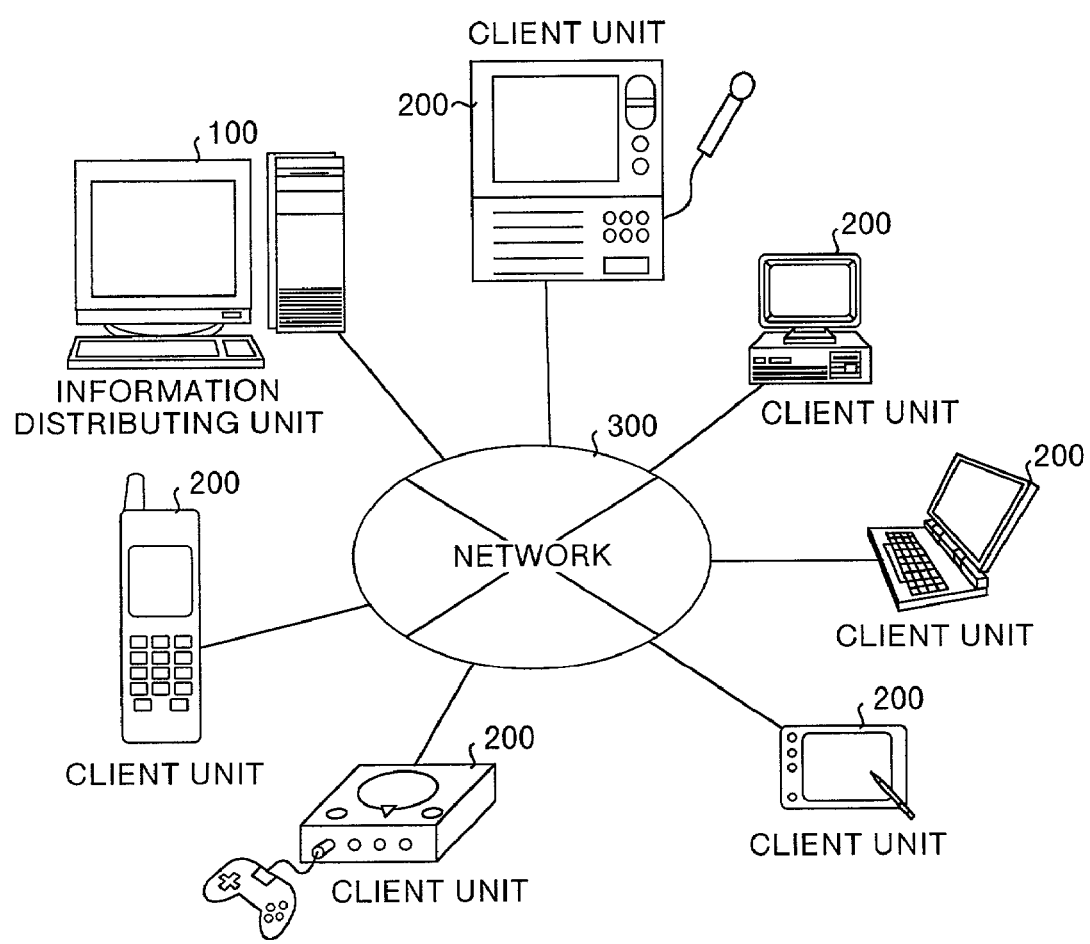
FIG. 1 is a block diagram that shows one example of a total structure of the present system.

An outline of the present system will be explained first, and a structure and processing of the present system will be explained after that. FIG. 1 is a block diagram that shows one example of a total structure of the present system. This shows only the concept of portions that are relevant to the present invention out of the total system structure.

In the present system, an information distributing unit 100 as a contents information processing device that processes distributed contents information is connected with client units 200 that are users' information terminal units, via a network 300 so that the information distributing unit 100 and the client units 200 can communicate with each other. Providers of contents information and advertising information and viewers of the contents information will be collectively called "users" when necessary.

This system has the following basic characteristics. The information distributing unit 100 provides contents information to the client units 200, or the client units 200 provide contents information to the information distributing unit 100, via the network 300 respectively.

The contents information is information relating to contents like images that are distributed from the information distributing unit 100 to the client units 200. The contents information is generated by the information distributing unit 100, the client units 200, or other units. This information is accumulated in the information distributing unit 100. Examples of the contents information are video information, sound information, and evaluation information.

Figure 2:
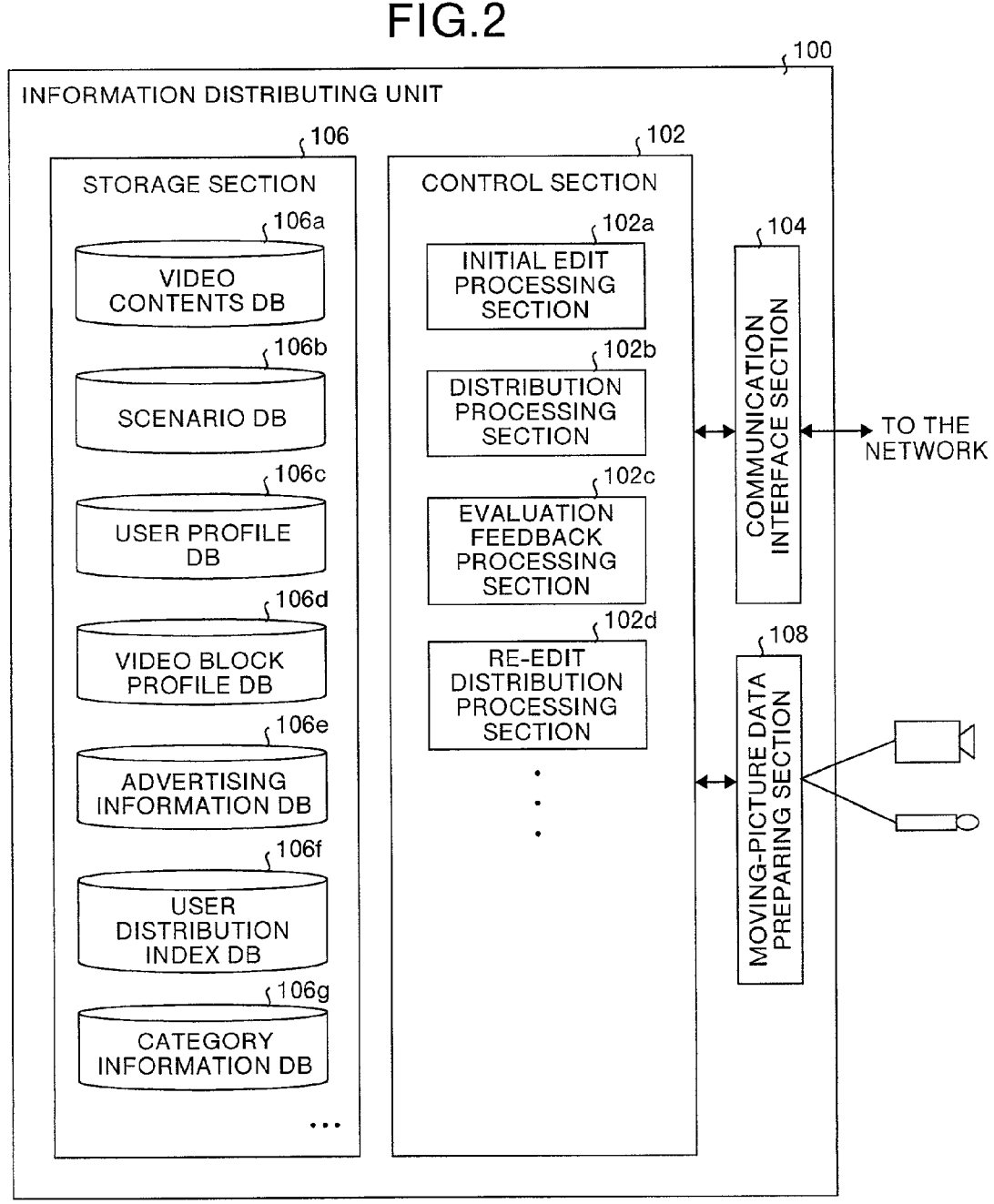
FIG. 2 is a block diagram that shows one example of a structure of an information distributing unit 100 to which the present invention is applied.

In order to make the basic characteristics more clear, a structure of the present system will be explained below. A structure of the information distributing unit 100 will be explained first. FIG. 2 is a block diagram that shows one example of a structure of the information distributing unit 100 to which the present invention is applied. This shows only the concept of portions that are relevant to the present invention out of the structure of the information distributing unit 100. In FIG. 2, the information distributing unit 100 is constructed of a control section 102 like a CPU that collectively controls the whole information distributing unit 100, a communication interface section 104 that is connected to a communication unit (not shown) like a router that is connected to a communication line or the like, a moving-picture data preparing section 108 that prepares moving data, and a storage section 106 that stores various kinds of databases (a video contents database 106a to a category information database 106g). These sections are connected so as to be able to communicate via optional communication lines. Further, this information distributing unit is connected to the network 300 so as to be able to communicate via a communication unit like a router and a wired or radio communication line like a private line.

The various kinds of databases (the video contents database 106a to the category information database 106g) that are stored in the storage section 106 are storage units like fixed disk units. These databases in the form of fixed disk units store various kinds of programs, tables, files databases, and web page files that are used to various kinds of process and provide web sites.

Among the constituent elements of the storage section 106, the video contents database 106a is a video contents information storing unit that stores information relating to video contents. The information stored in this video contents database 106a includes video contents identification information that uniquely identifies video contents, attribute information that is relevant to various kinds of attributes of video contents (for example, names of contents, producers, right owners, etc.), and video contents data. These pieces of information are related to each other in this video contents database 106a.

A scenario database 106b is a scenario storing unit that stores information relating to scenarios of video contents. The information stored in this scenario database 106b includes scenario identification information that uniquely identifies scenarios, attribute information that is relevant to various kinds of attributes of scenarios (for example, video contents identification information, producers, etc.), and scenario data. These pieces of information are related to each other in this scenario database 106b.

A user profile database 106c is a user information storing unit that stores information relating to users. The information stored in this user profile database 106c includes user identification information that uniquely identifies users, basic information relating to attributes of users (for example, names, addresses, electronic mail addresses, ages, etc.), and preference information relating to users' preferences (user identification information, category identification information, weight information, etc.). These pieces of information are related to each other in this user profile database 106c.

A video block profile database 106d is a video block profile information storing unit that stores video block profile information that is relevant to video blocks of video contents. The information stored in this video block profile database 106d includes video block identification information that uniquely identifies video blocks, and attribute information that is relevant to various kinds of attributes of video blocks (for example, starting times or starting frames, object identification information, ending times or ending frames, category information, weight information, etc.). These pieces of information are related to each other in this video block profile database 106*d*.

An advertising information database 106*e* is an advertising information storing unit that stores information relating to advertising. The information stored in this advertising information database 106*e* includes advertising information identification information that uniquely identifies advertising information, attribute information that is relevant to various kinds of attributes of advertising information (for example, category information, weight information, etc.), and advertising data (including video data and sound data) These pieces of information are related to each other in this advertising information database 106*e*.

A user distribution index database 106*f* is a user distribution index storing unit that stores information relating to user distribution indexes. The information stored in this user distribution index database 106*f* includes user distribution index identification information that uniquely identifies user distribution indexes, attribute information that is relevant to various kinds of attributes of user distribution indexes (for example, user identification information, video contents identification information, etc.), and video block identification information of video blocks to be distributed. These pieces of information are related to each other in this user distribution index database 106*f*.

A category information database 106*g* is a category information storing unit that stores information relating to categories. The information stored in this category information database 106*g* includes category information identification information that uniquely identifies category information, and attribute information that is relevant to various kinds of attributes of category information (for example, names, category information identification information of high-order categories, category information identification information of low-order categories, etc.). These pieces of information are related to each other in this category information database 106*g*.

The storage section 106 of the information distributing unit 100 is recorded with various kinds of web data and CGI programs to provide web sites to client units 200.

In FIG. 2, the communication interface section 104 carries out a communication control between the information distributing unit 100 and the network 300 (or the communication unit like a router). In other words, the communication interface section 104 has a function of communicating data with other terminals via the communication line.

In FIG. 2, the moving-picture data preparing section 108 has a function of preparing moving data to carry out a streaming broadcasting. In general, as standard moving-picture formats that are utilized in the streaming broadcasting on the Internet, MPEG (moving picture experts group) and H.26x are available. In order to minimize the quantity of data to be handled, the moving-picture format encodes (quantizes, or compresses) moving-picture images. All screens are expressed as differential information based on lapse of time from key frames (screens that becomes a base). The moving-picture data preparing section 108 executes the encoding based on these moving-picture formats, according to software or hardware.

In FIG. 2, the control section 102 has an internal memory that stores a control program of an operating system (OS), a program that prescribes various kinds of processing procedures, and required data. The control section 102 carries out information processing that executes various kinds of processing based on these programs. The control section 102 is constructed of an initial edit processing section 102*a*, a distribution processing section 102*b*, an evaluation feedback processing section 102*c*, and a re-edit distribution processing section 102*d*, in order to achieve various kinds of functions.

Among these sections, the initial edit processing section 102*a* is an initial edit processing unit that carries out an initial edit processing of contents. The distribution processing section 102*b* is a contents distribution processing unit that carries out a processing of distributing contents to the client units 200. The evaluation feedback processing section 102*c* is an evaluation feedback processing unit that carries out a processing of feeding back a user's evaluation of distributed contents. The re-edit distribution processing section 102*d* is a re-edit distribution processing unit that re-edits the contents based on a user's evaluation, and distributes re-edited contents. The contents of processing to be carried out by these sections will be explained in detail later.

A structure of the client unit 200 will be explained next. The client unit 200 is constructed of a control section, a ROM, a RAM, an HD, an input unit, an output unit, an input/output control IF, and a communication control IF. These sections are connected so as to be able to communicate via a bus.

The control section of the client unit is constructed of a web browser, a stream player, and an electronic mailer. The web browser interprets web data, and carries out a display control (brows processing) which makes a display on a monitor to be described later. The stream player has a function of carrying out a reception, a display, and a feedback of evaluation of a stream video. The stream player may be plugged in the web browser. The electronic mailer carries out transmission/reception of electronic mails according to a predetermined communication rule (for example, SMTP (simple mail transfer protocol), and POP3 (post office protocol version 3)).

As the input unit, it is possible to use a keyboard, a mouse, and a microphone. The monitor to be described later also realizes a pointing device function in co-operation with the mouse. As the output unit, it is possible to use a speaker in addition to a monitor (including a home television). (In the following description, a monitor will be explained as the output unit.)

The communication control IF carries out a communication control between the client units 200 and the Internet (or a communication unit like a router). This communication control IF is a communication unit that carries out communications with the network 300.

Each client unit 200 that has the above structure is connected to the Internet via a communication unit like a modem, a TA and a router, and a telephone line, or via a private line. Each client unit 200 can make access to the information distributing unit 100 according to a predetermined communication rule (for example, the TCP/IP Internet protocol).

Each client unit 200 has a function of displaying video contents that have been received from the information distributing unit 100 on the monitor, based on the processing of the browser, and a function of transmitting information on user's evaluation of the video contents to the information distributing unit 100.

A structure of the network 300 will be explained next. The network 300 has a function of mutually connecting between the information distributing unit 100 and the client units 200. The network 300 is the Internet, for example.

One example of a processing of the present system that has the above structure in the present embodiment will be explained in detail below with reference to FIG. 3 to FIG. 18.

Figure 3:
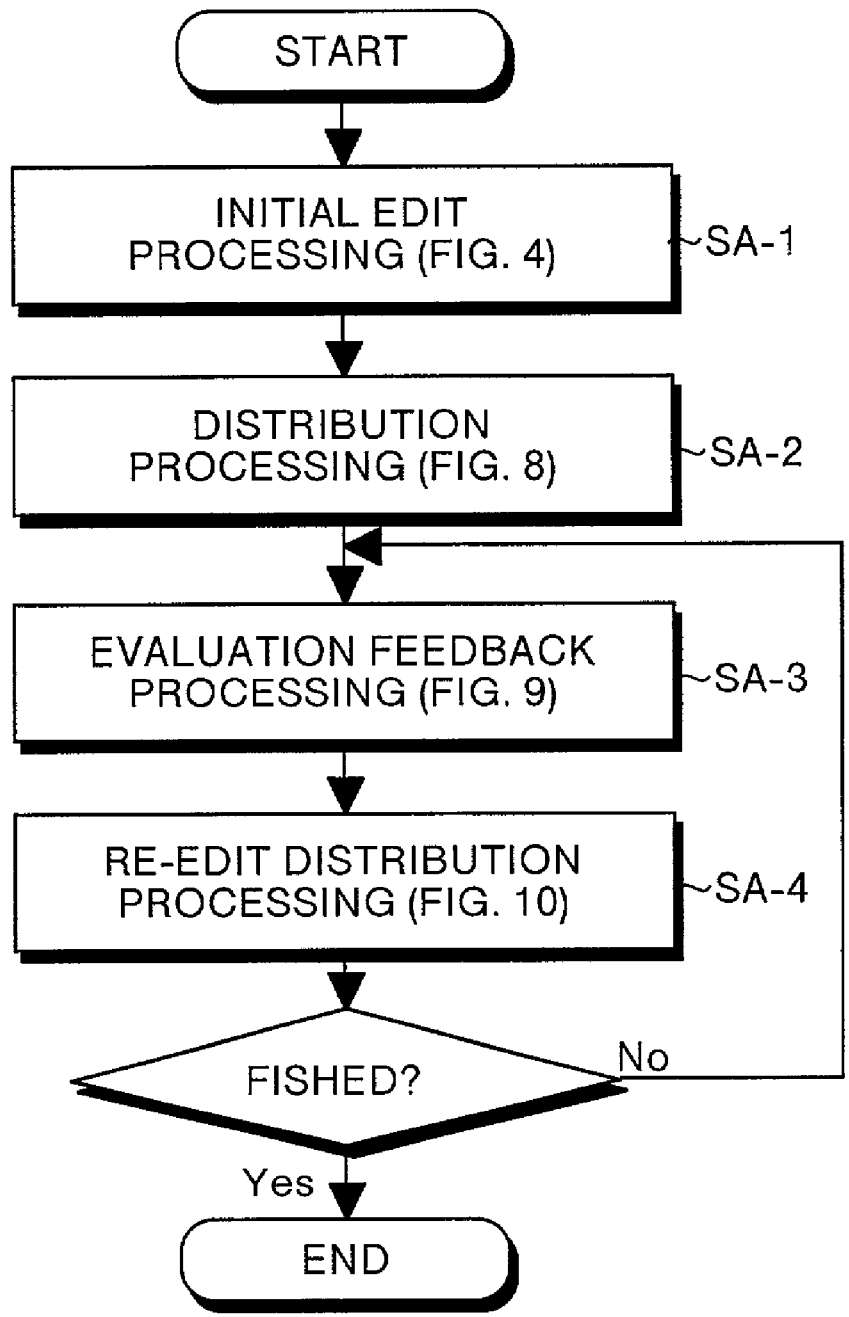
FIG. 3 is a flowchart that shows one example of a main processing of the present system in an embodiment.

An outline of the main processing of the present system will be explained below with reference to FIG. 3. FIG. 3 is a flowchart that shows one example of the main processing of the present system in the embodiment.

The information distributing unit 100 executes the "initial edit processing" to be described later, based on the processing of the initial edit processing section 102a. In this processing, the information distributing unit 100 prepares video contents, and defines a profile of each video block in the video contents (step SA-1).

The information distributing unit 100 executes the "distribution processing" to be described later, based on the processing of the distribution processing section 102b. In this processing, the information distributing unit 100 prepares user distribution indexes that have been edited by extracting a suitable video block from the video contents, based on a profile of a user as a distribution destination. The information distributing unit 100 distributes the video contents based on the edited user distribution indexes of this user (step SA-2).

The information distributing unit 100 executes the "evaluation feedback processing" to be described later, based on the processing of the evaluation feedback processing section 102c. In this processing, the information distributing unit 100 obtains a user's evaluation of the distributed video contents, from the user (step SA-3).

The information distributing unit 100 executes the "re-edit distribution processing" to be described later, based on the processing of the re-edit distribution processing section 102d. In this processing, the information distributing unit 100 re-edits user distribution indexes of video contents to be distributed, based on the user's evaluation obtained from the user, and distributes the re-edited video contents (step SA-4).

The information distributing unit 100 decides whether the processing has been finished for all the contents information or not. When the processing has not been finished for all the contents information, the information distributing unit 100 returns to step SA-3. Then, the main processing finishes.

Each step of the processing will be explained in more detail below.

Figure 4:
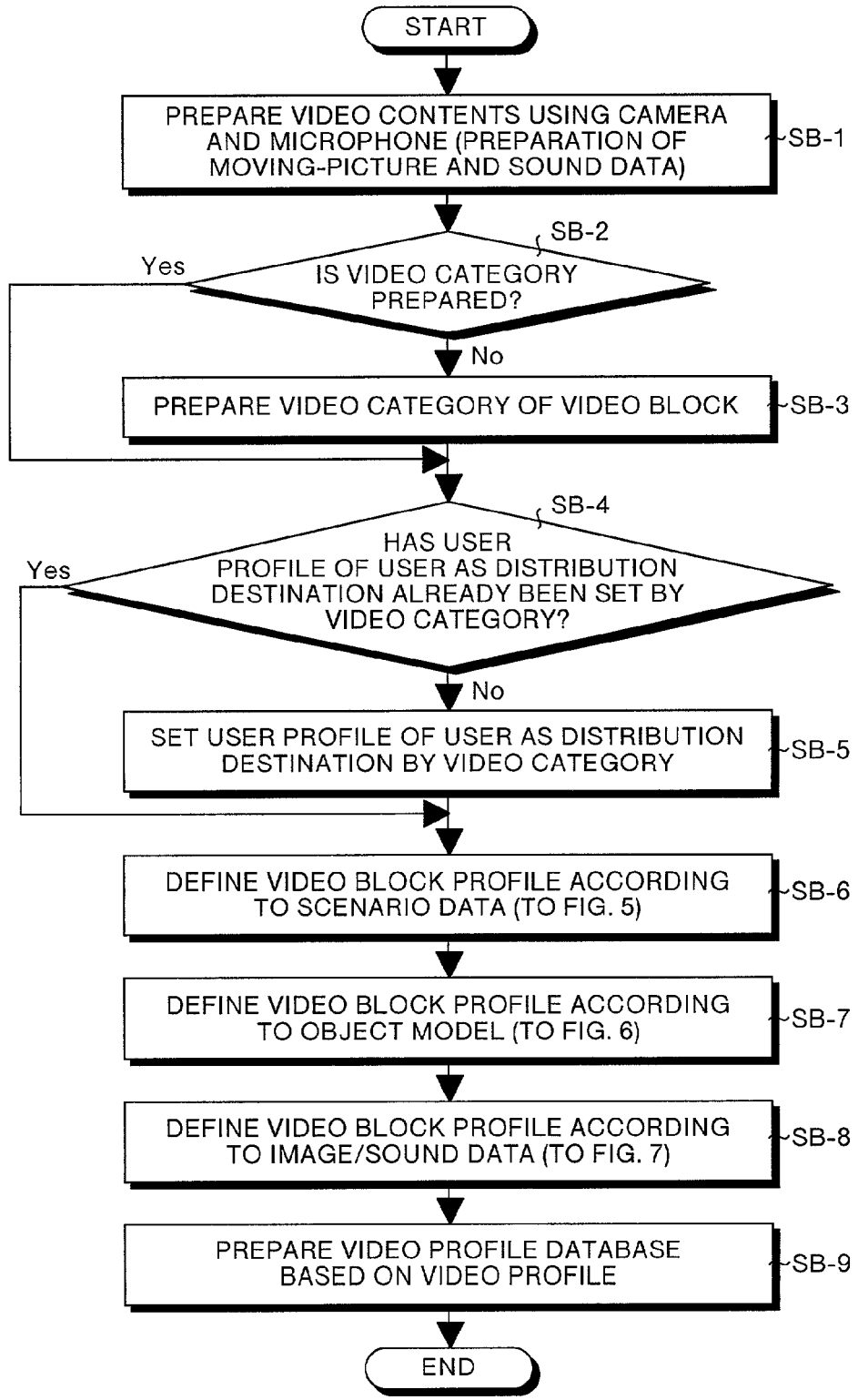
FIG. 4 is a flowchart that shows one example of an initial edit processing of the present system in the embodiment.

The initial edit processing that is executed at step SA-1 in FIG. 3 will be explained in detail. FIG. 4 is a flowchart that shows one example of the initial edit processing of the system in the embodiment.

The initial edit processing section 102a prepares video contents (including moving-picture data and sound data) for the moving-picture data preparing section 108 (step SB-1)

At the time of distributing video contents stored in a suitable moving-picture format from a server to a client, the information distributing unit 100 automatically edits the video contents that become the distribution data, based on a user profile of the user and a video block profile of the video contents, in the following order.

Figure 11:
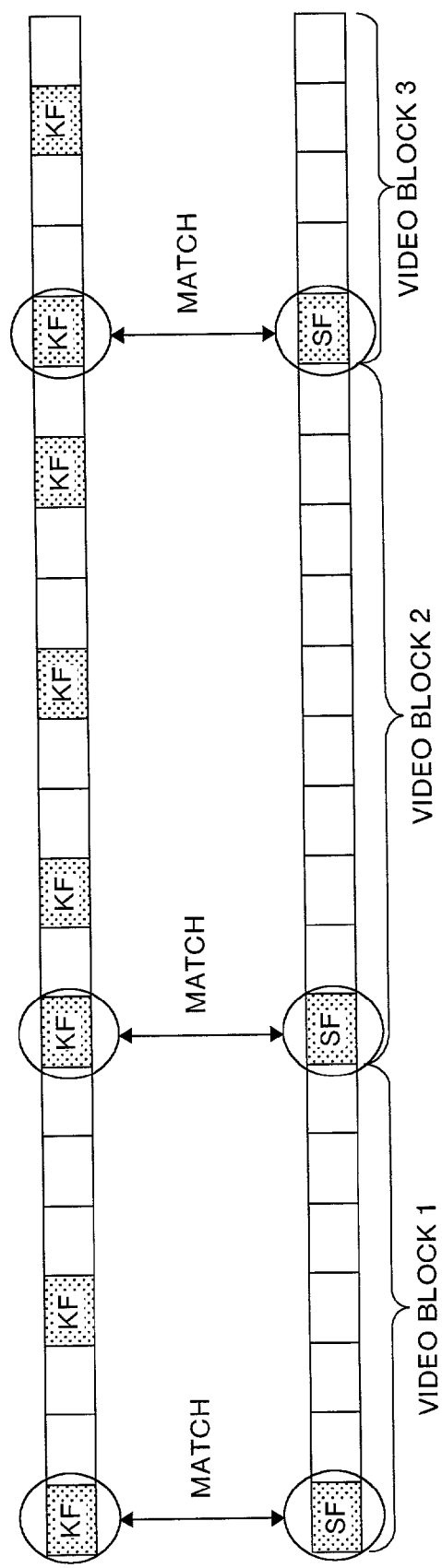
FIG. 11 is a diagram that explains the concept of a video block.

The concept of a "video block" will be explained with reference to FIG. 11. FIG. 11 is a diagram that explains the concept of a video block. In FIG. 11 "KF" denotes a key frame of a video, and "SF" denotes a starting frame of a video block. As shown in FIG. 11, a video block is a unit of video data that consists of a series of scenes that have a meaning.

Figure 12:
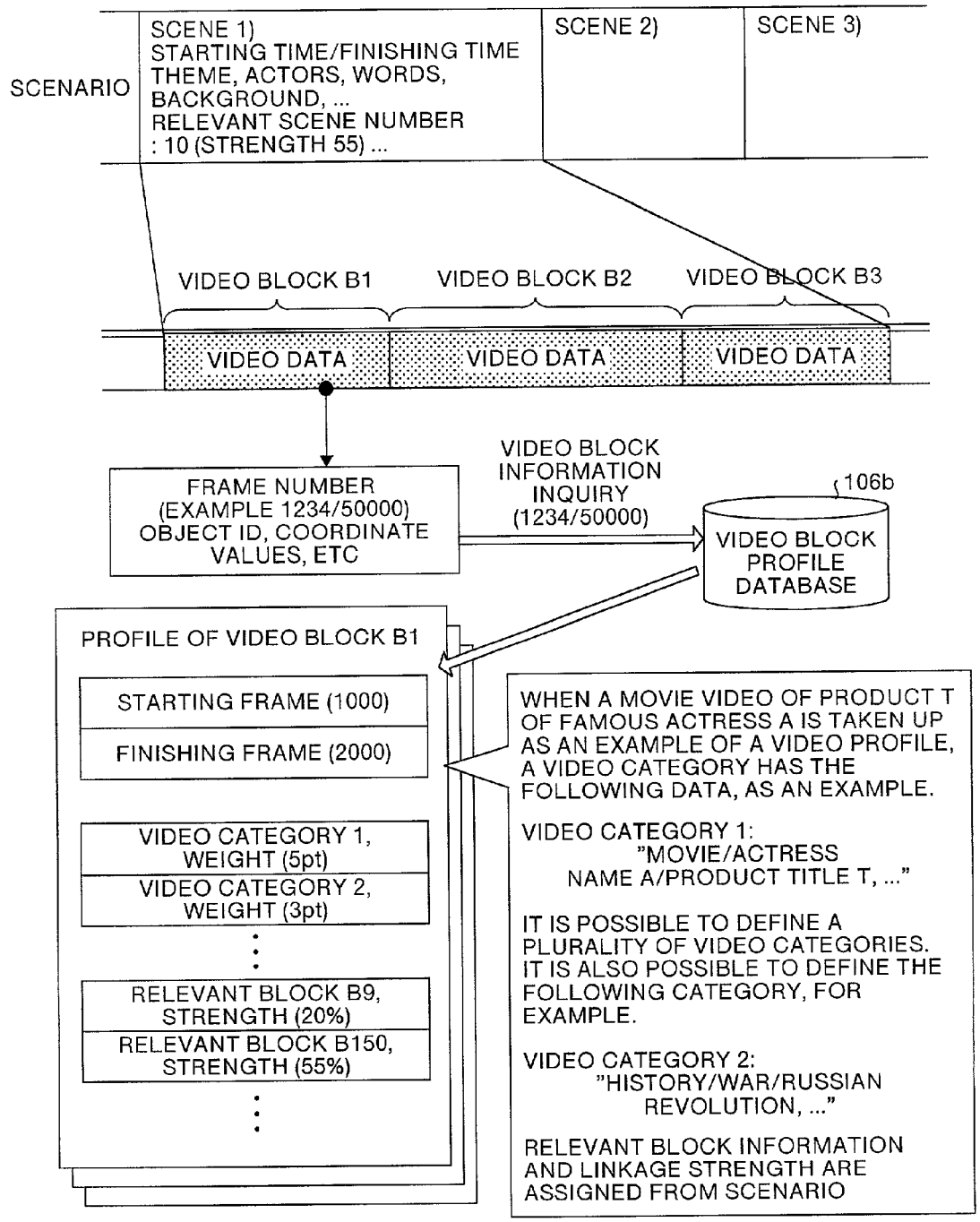
FIG. 12 is a diagram that explains the concept of a video block profile.

The concept of a "video block profile" will be explained with reference to FIG. 12. FIG. 12 is a diagram that explains the concept of a video block profile. As shown in FIG. 12, a video block is automatically extracted for each scene that has a meaning, from among videos. A starting time (or a starting frame), an ending time (or an ending frame) information relating to persons who appear on the video (for example, category information, weight information, etc.) video block identification information of a relevant block, and strength of relationship with the relevant block, are defined for each video block. These pieces of information are stored in the video block profile database 106d.

An editor may classify moving-picture data for each meaningful scene. Several video blocks that have key frames as starting frames are selected, as a minimum unit, and one video block is prepared. A starting frame, an ending frame, and category information are prepared as a profile of this video block. An index key of a video block of the video contents is prepared based on this profile.

In the instance of a digitized moving picture and sound data, who appear on the video block and what they are talking are extracted, based on image recognition and sound recognition methods according to the extraction of features of these persons such as their appearance, styles and clothes. An index key of a video block of the video contents is prepared by using the extracted profiles as keys.

When images are prepared using object models as prescribed in the MPEG system, the object identification information and the profile are related to each other using indexes, in order to make it possible to refer to the video block profile data of this object (a person or an object) This processing will be explained in detail later.

Referring back to FIG. 4, the initial edit processing section 102a checks whether category information to determine a category of the video has already been prepared or not, by referring to the category information database 106g (step SB-2). When category information has not yet been prepared, the initial edit processing section 102a makes the user prepare the category information, and stores the prepared category information in the category information database 106g (step SB-3).

Various patterns are considered according to kinds of contents. When a movie in which a certain actress is acting is considered, for example, it is possible to classify categories like movie/actor and actress/name of actress/title of product/scene.

The initial edit processing section 102a checks whether a user profile of a user as a distribution destination has already been prepared or not, by referring to the user profile database 106c (step SB-4). When a user profile has not yet been prepared, the initial edit processing section 102a prepares the user profile, and stores the prepared user profile in the user profile database 106c (step SB-5).

Figure 16:
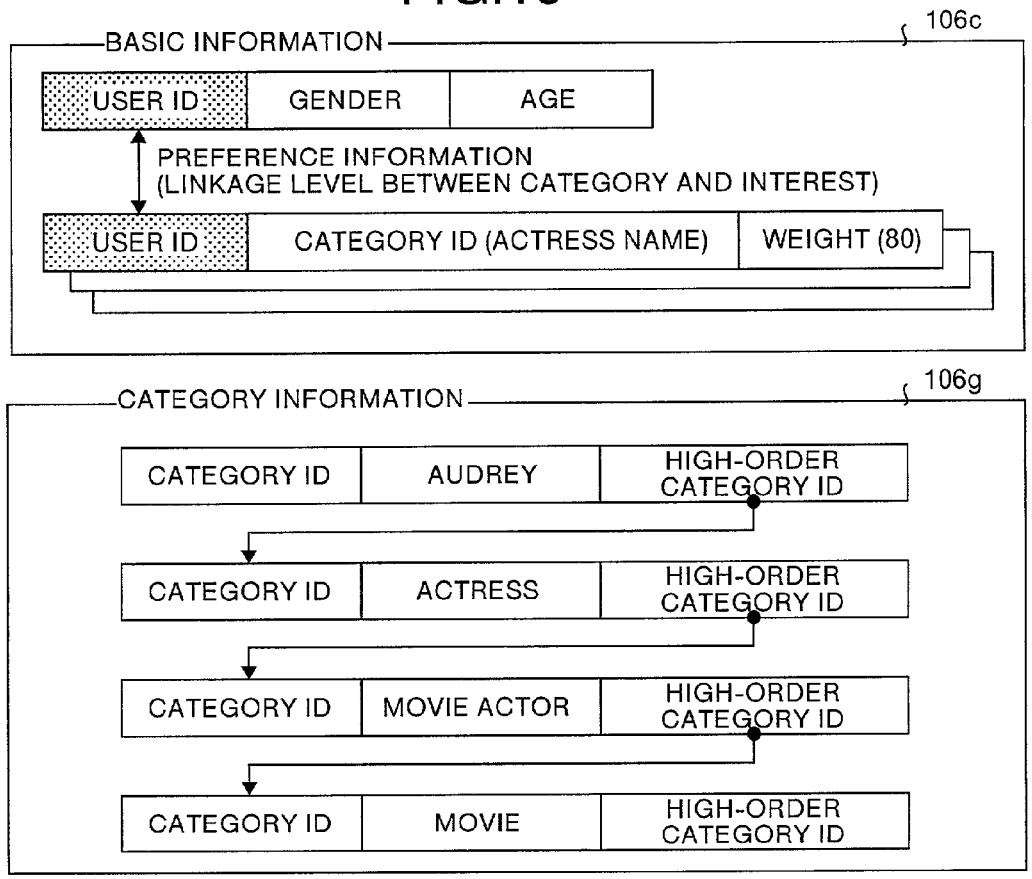
FIG. 16 is a conceptional diagram that shows a relationship between a user profile and category information.

FIG. 16 is a conceptional diagram that shows a relationship between a user profile and category information. There are various methods which collect and classify preferences of individuals. Among these methods, a method that is particularly suitable for a video field is selected. Preferences of individuals are collected and classified in advance, based on a simple Q and A method or questionnaires using a web site. User profiles are prepared based on these methods. Based on the utilization of these user profiles as described later, it becomes possible to determine distribution destinations by category information more accurately from among pre-set distribution destinations by categories.

Assume that a certain user has interest in "Audrey" that is classified as actress category information, for example, as shown in FIG. 16. In this instance, the initial edit processing section 102a may calculate incremental points of a movie actress category, a movie actor category, and a movie information category of high-order categories, according to ratios to total points of categories, and reflect these points in the user preference table. (For example, twenty points are added to an actress, fifteen points are added to a movie actor, and ten points are added to a movie, and they are registered in the user profile database 106*c*.)

Figure 5:
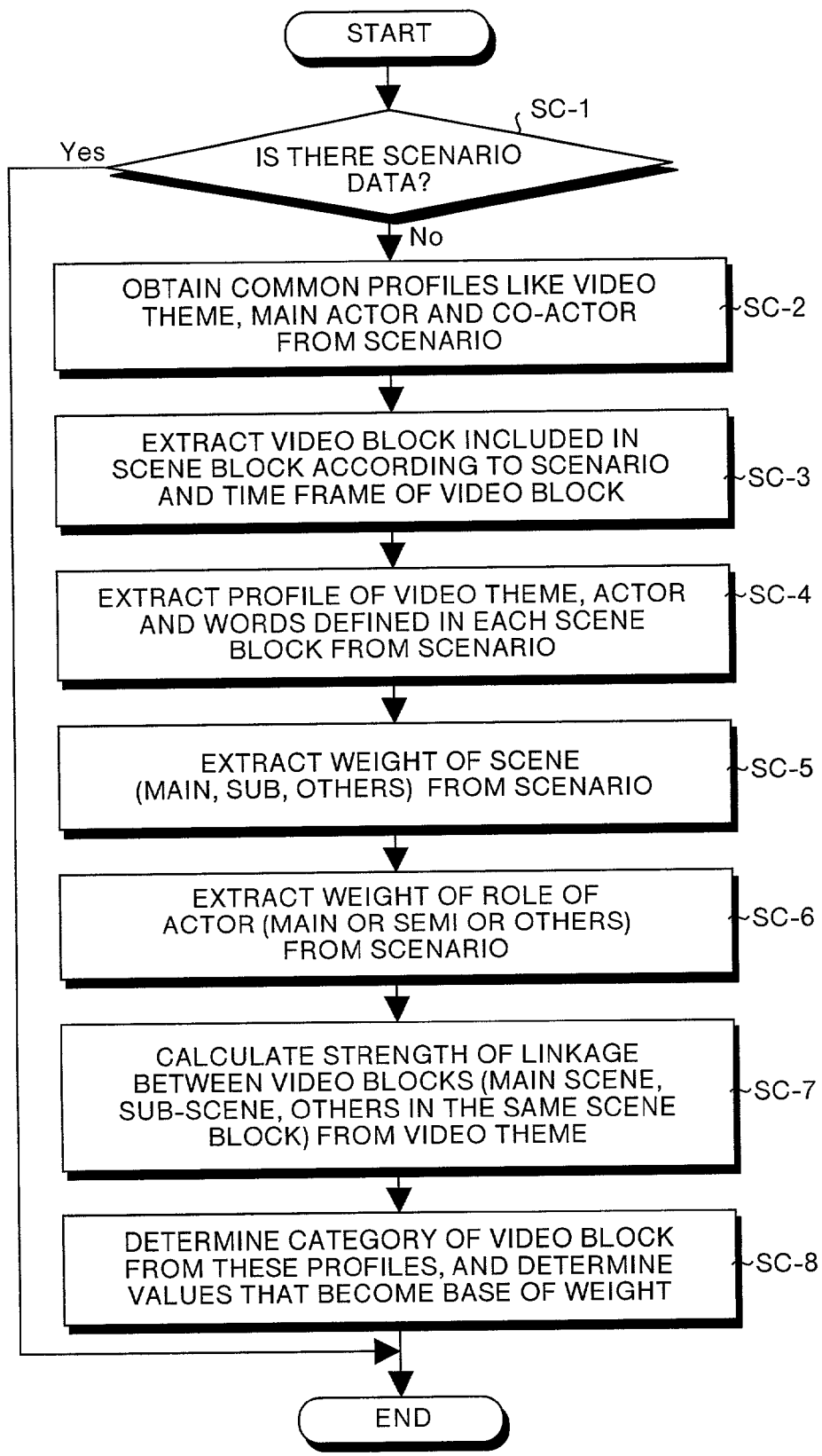
FIG. 5 is a flowchart that shows one example of a processing that defines a video block profile according to a scenario data of the present system.

Referring back to FIG. 4, when a scenario corresponding to the video contents has been stored in the scenario database 106*b*, the initial edit processing section 102*a* defines a video block profile according to a scenario data (step SB-6) The processing that defines a video block profile according to a scenario data will be explained in detail with reference to FIG. 5. FIG. 5 is a flowchart that shows one example of a processing that defines a video block profile according to a scenario data of the system in the present embodiment.

The initial edit processing section 102*a* checks whether a scenario corresponding to video contents to be edited has been registered or not, by referring to the scenario database 106*b* (step SC-1). When a scenario corresponding to video contents to be edited has been registered, the initial edit processing section 102*a* carries out the processing at step SC-2 to step SC-8.

Usually, video contents are prepared based on a scenario. A scenario data includes basic information such as an explanation of a scene, actors and actresses, and words, for each time frame. Based on a comparison between the time frame of this scenario data and a time frame of a video block of moving-picture data, it becomes possible to extract actors and actresses who appear in this video block and contents of the scene (step SC-2 to step SC-4).

Weight points of category information are determined based on a comparison between a scenario and category information. First, it is automatically judged which video block corresponds to a main scene, from the scenario (step SC-5).

It is automatically judged whether a person who appears in the video block is a main actor (actress) or a supporting actor (actress), based on an area ratio of a noted object (a person or an object) on the screen, a displayed position and sound volume of the person, etc. (step SC-6).

A scene in which a main actor (actress) appears and speaks in close-up on the screen has a relatively high weight point of a special category. A scene of only a background has a small weight point.

Assume that weight indexes are displayed in three stages of 1 to 3, for example. A weight G of a category of a certain person in a certain video block is expressed based on a combination of R, S, M, and V, using three stages, as follows. R represents a role index of a main actor (actress) or a supporting actor (actress) (main actor: 3, semi-main actor: 2, supporting actor or others: 1). S represents a scene classification (main: 3, semi-main: 2, others: 1). M represents an index according to a relative ratio of an area on the screen (large: 3, medium: 3, small: 1). V represents a sound volume ratio (large: 3, medium: 3, small: 1). In this instance, it is possible to use the following equation.

$$G = R \times S \times M \times V \quad (1)$$

When a certain actress is speaking as a semi-actress on a main scene of a movie (the actress is in close-up, although a relative sound volume is small), the category of this actress is expressed as follows.

$$G = 2 \times 3 \times 3 \times 1 \quad (2)$$

This value is defined as weight information of one category information that is defined in the video block.

In the mean time, in order to prevent a fractional distribution of video blocks that have been classified in this way, it is necessary to define in advance special block groups that need to be distributed without fail, based on the scenario data. In order to realize this, linkage strength is assigned in advance to videos that have strong relationship with each other on the story, between scenes within the scenario, as an assumption (step SC-7).

Based on this arrangement, the assigned linkage strength is reflected straight to the video blocks. Therefore, it becomes possible to distribute the relevant video blocks without exception, when it is necessary to distribute these video blocks in relation to the distribution of certain video blocks, or when there is room in the distribution schedule.

The initial edit processing section 102*a* determines category information of video blocks by referring to the category information database 106*g*. The initial edit processing section 102*a* determines values that become the base of weight values, and stores these values in the video block profile database 106*d* (step SC-8). Then, the processing that defines video block profiles based on the scenario data finishes.

Figure 17:
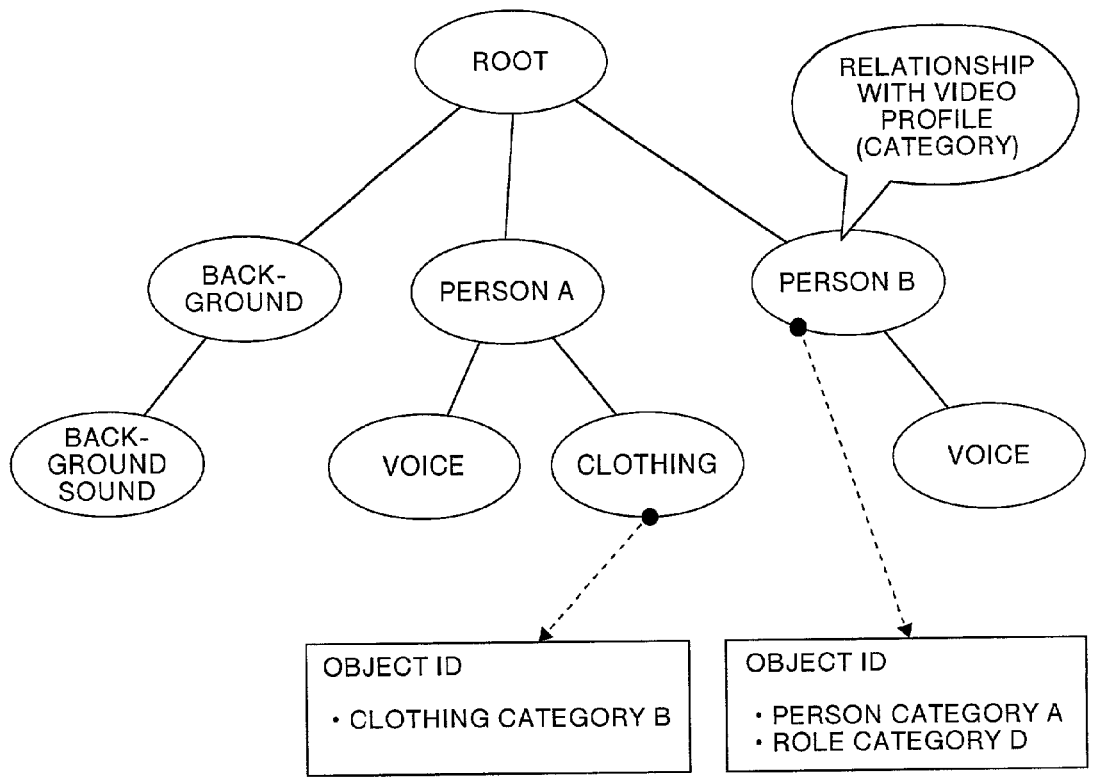
FIG. 17 is a diagram that shows the concept of an object model.

Referring back to FIG. 4, the initial edit processing section 102*a* defines a video block profile based on an object model (step SB-7). FIG. 17 is a diagram that shows the concept of an object model. The "object model" is an element that constitutes a video. For example, the object model is a model in which video data or sound data of persons, objects, and backgrounds that appear on the video are defined in hierarchy of two or more layers. Generally, in many instances, digital videos are structured based on an object model.

In the present processing, profile data is generated based on the object model. This processing is effective when there is no scenario data or when it is desired to complement a video block profile that is generated based on a scenario. Particularly, when an object assignment to be described later is carried out at the time of a user evaluation, the data complementation based on the present processing becomes necessary.

Figure 6:
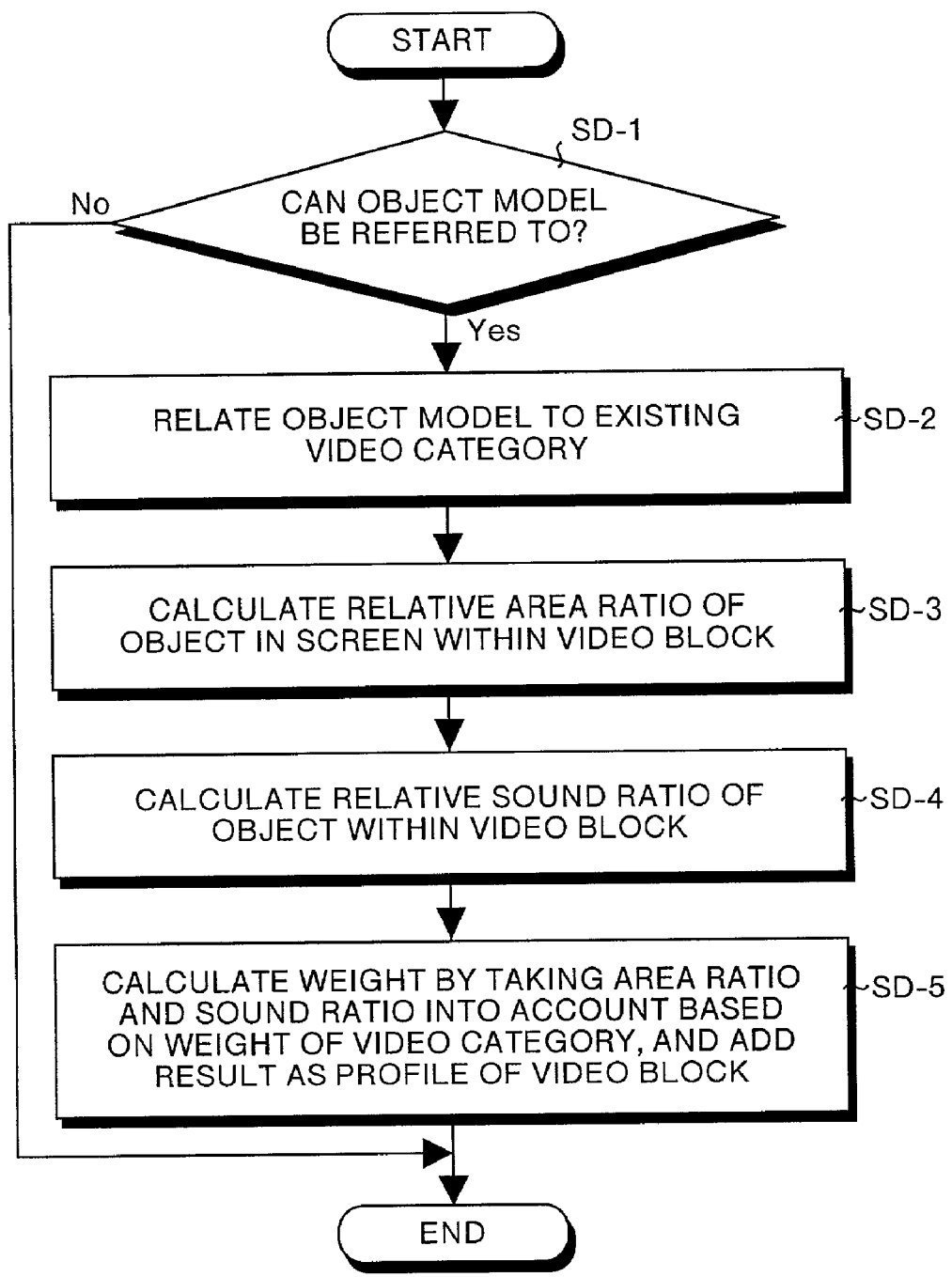
FIG. 6 is a flowchart that shows one example of a processing that defines a video block profile based on an object model of the present system in the embodiment.

The processing that defines a video block profile based on the object model will be explained in detail with reference to FIG. 6. FIG. 6 is a flowchart that shows one example of a processing that defines a video block profile based on the object model of the system in the embodiment.

When it is possible to refer to an object model in the video block (for example, when video contents are a 2D video) (step SD-1), the initial edit processing section 102*a* relates the object that appears in the video block to the category information that is stored in the category information database 106*g* (step SD-2).

The initial edit processing section 102*a* calculates an area ratio and a sound volume ratio of the object (step SD-3 and step SD-4), calculates a numerical value of weight information of the object, and stores the calculated result in the video block profile database 106*d* (step SD-5). Then, the processing that defines a video block profile based on the object model finishes.

Referring back to FIG. 4, the initial edit processing section 102*a* defines a video block profile based on an image recognition or a sound recognition (step SB-8). The present processing is effective when the video contents do not have the above scenario and also when the video contents are an analog video (there is no object model), for example.

Figure 7:
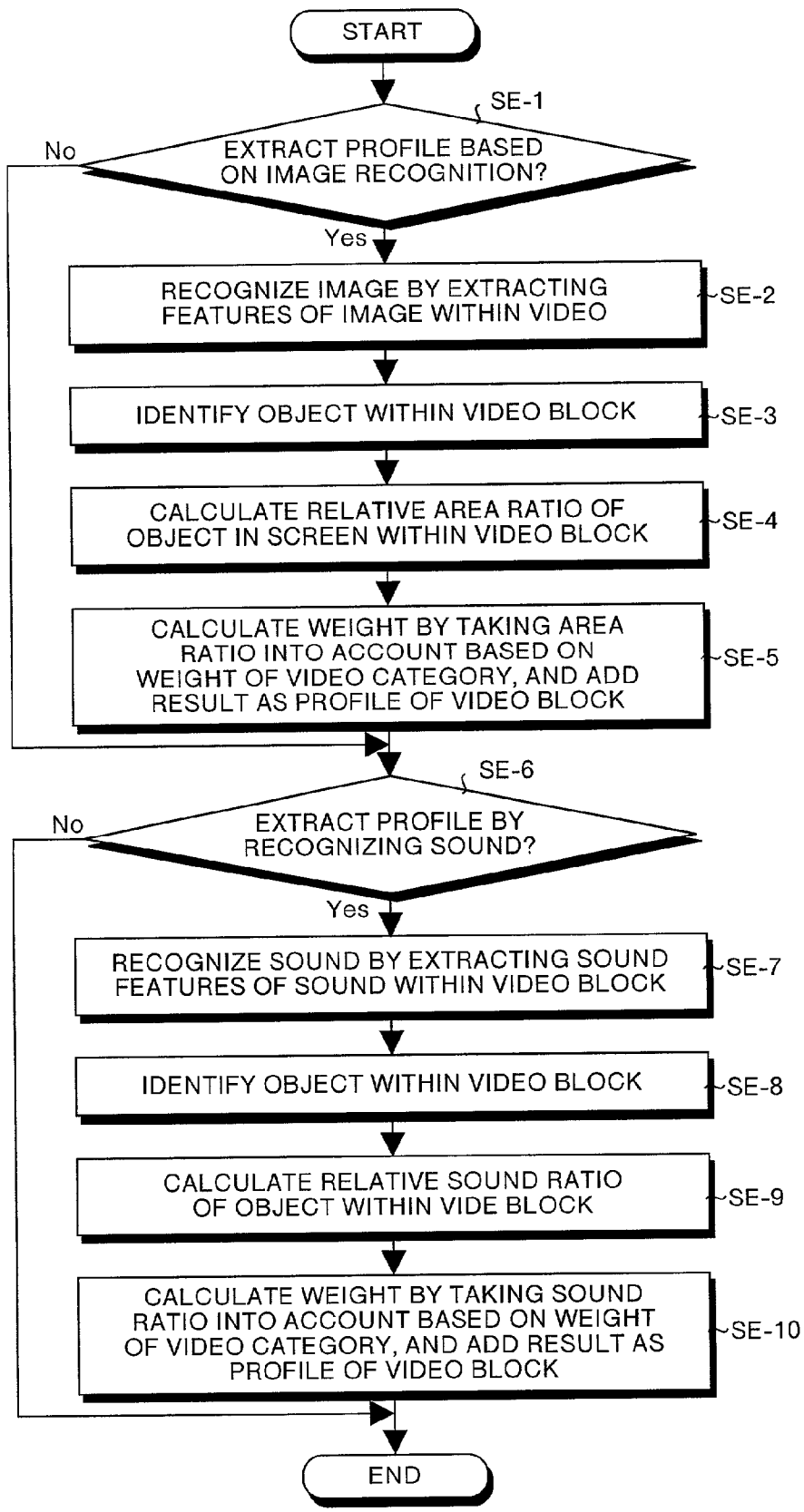
FIG. 7 is a flowchart that shows one example of a processing that defines a video block profile based on an image recognition or a sound recognition of the present system in the embodiment.

The processing that defines a video block profile based on an image recognition or a sound recognition will be explained in detail with reference to FIG. 7. FIG. 7 is a flowchart that shows one example of a processing that defines a video block profile based on an image recognition or a sound recognition of the system in the embodiment.

When a video block profile is to be extracted based on an image recognition (step SE-1) the initial edit processing section 102a executes an image analysis of an image within the video block, and extracts features thereby to recognize the image (step SE-2).

The initial edit processing section 102a relates the object extracted based on the image recognition in the video block to the category information stored in the category information database 106g (step SE-3).

The initial edit processing section 102a calculates an area ratio of the object (step SE-4), calculates a numerical value of weight information of the object, and stores the calculated result in the video block profile database 106d (SE-5).

When a video block profile is to be extracted based on a sound recognition (step SE-6) the initial edit processing section 102a executes sound analysis of sound within the video block, and extracts features thereby to recognize the sound (step SE-7).

The initial edit processing section 102a relates the object extracted based on the sound recognition in the video block to the category information stored in the category information database 106g (step SE-8).

The initial edit processing section 102a calculates a sound ratio of the object (step SE-9), calculates a numerical value of weight information of the object, and stores the calculated result in the video block profile database 106d (SE-10). Then, the processing that defines a video block profile based on an image recognition or a sound recognition finishes.

Referring back to FIG. 4, the initial edit processing section 102a prepares a video block profile for all the video blocks based on the above processing, and stores the video block profile in the video block profile database 106d (step SB-9). After preparing the video block profile for all the video blocks, the initial edit processing section 102a prepares indexes to search, and stores the indexes in the video block profile database 106d as a database of the video contents. With this arrangement, it becomes possible to inquire category information of the video block based on the inquiry of a frame number, as explained with reference to the video block profile conceptional diagram in FIG. 12. Then, the initial edit processing finishes.

Figure 8:
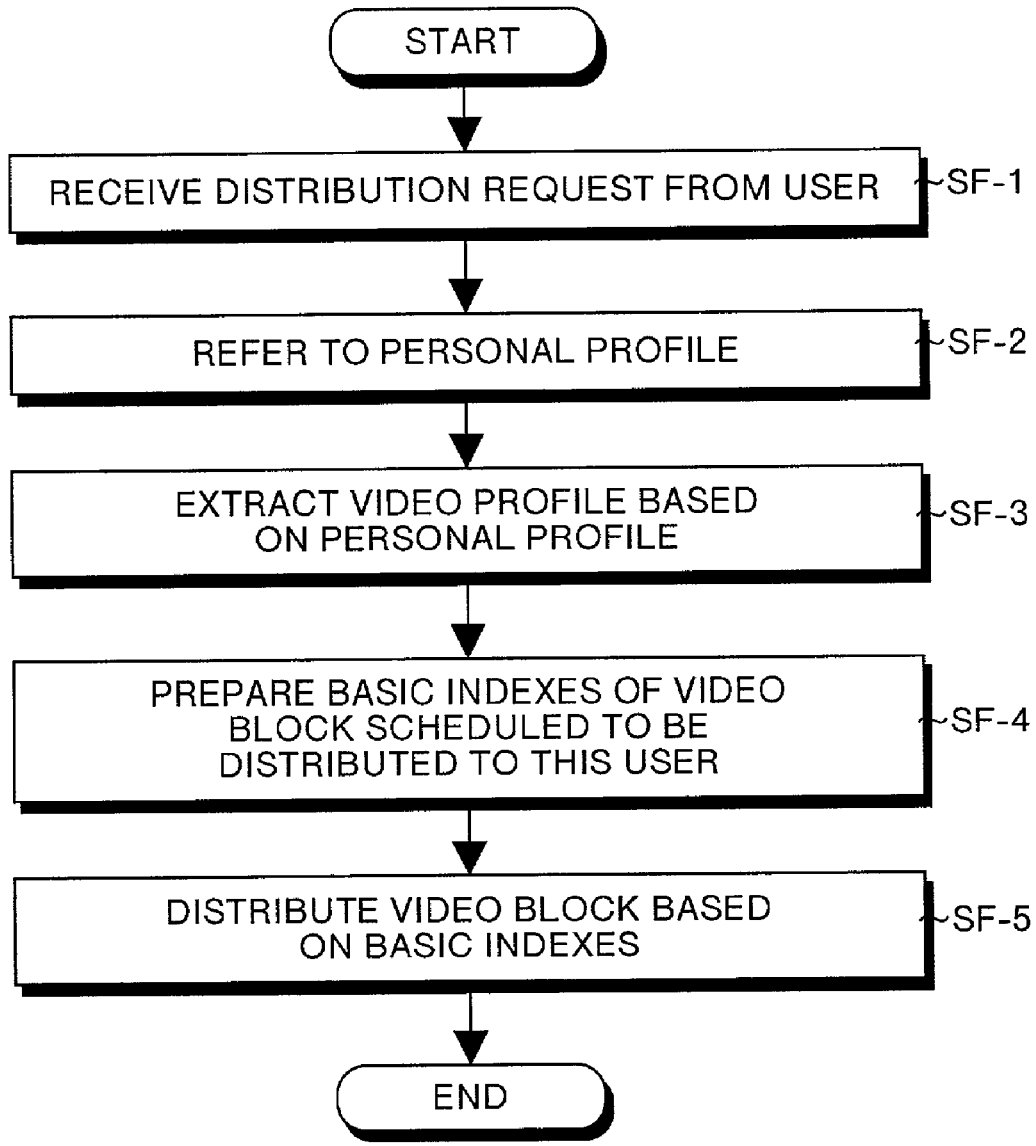
FIG. 8 is a flowchart that shows one example of a distribution processing of the present system in the embodiment.

The distribution processing that is executed at step SA-2 in FIG. 3 will be explained in detail next. FIG. 8 is a flowchart that shows one example of the distribution processing of the present system in the embodiment.

First, the client unit 200 is connected to the information distributing unit 100 via the Internet. A user carries out this connection by assigning an address of a web site (like URL) that is provided by the information distributing unit 100, on the screen of browser software via the input unit. A method of connecting to the web site and a method of reading the web site can be realized using conventional techniques, and therefore, their detailed explanation will be omitted here.

The user transmits a distribution request which distributes desired video contents, to the information distributing unit 100, and the information distributing unit 100 receives this distribution request (step SF-1).

The distribution processing section 102b refers to the user profile database 106c, and refers to a user profile of the user who has transmitted the distribution request (step SF-2).

The distribution processing section 102b refers to the video block profile database 106d of the video contents to be distributed, and extracts a video block that matches the basic information or the preference information of the user based on the user profile. In other words, the distribution processing section 102b carries out a matching between the attribute information of the video block profile and the basic information or the preference information of the user (a matching method will be explained in detail later) The distribution processing section 102b extracts matched video blocks (step SF-3).

The distribution processing section 102b prepares user distribution indexes that are a time-series collection of information of video blocks that are scheduled to be distributed to the user, based on the extracted video blocks (step SF-4).

The processing at step SF-2 to step SF-4 will be explained in more detail with reference to FIG. 13 and FIG. 14.

Figure 13:
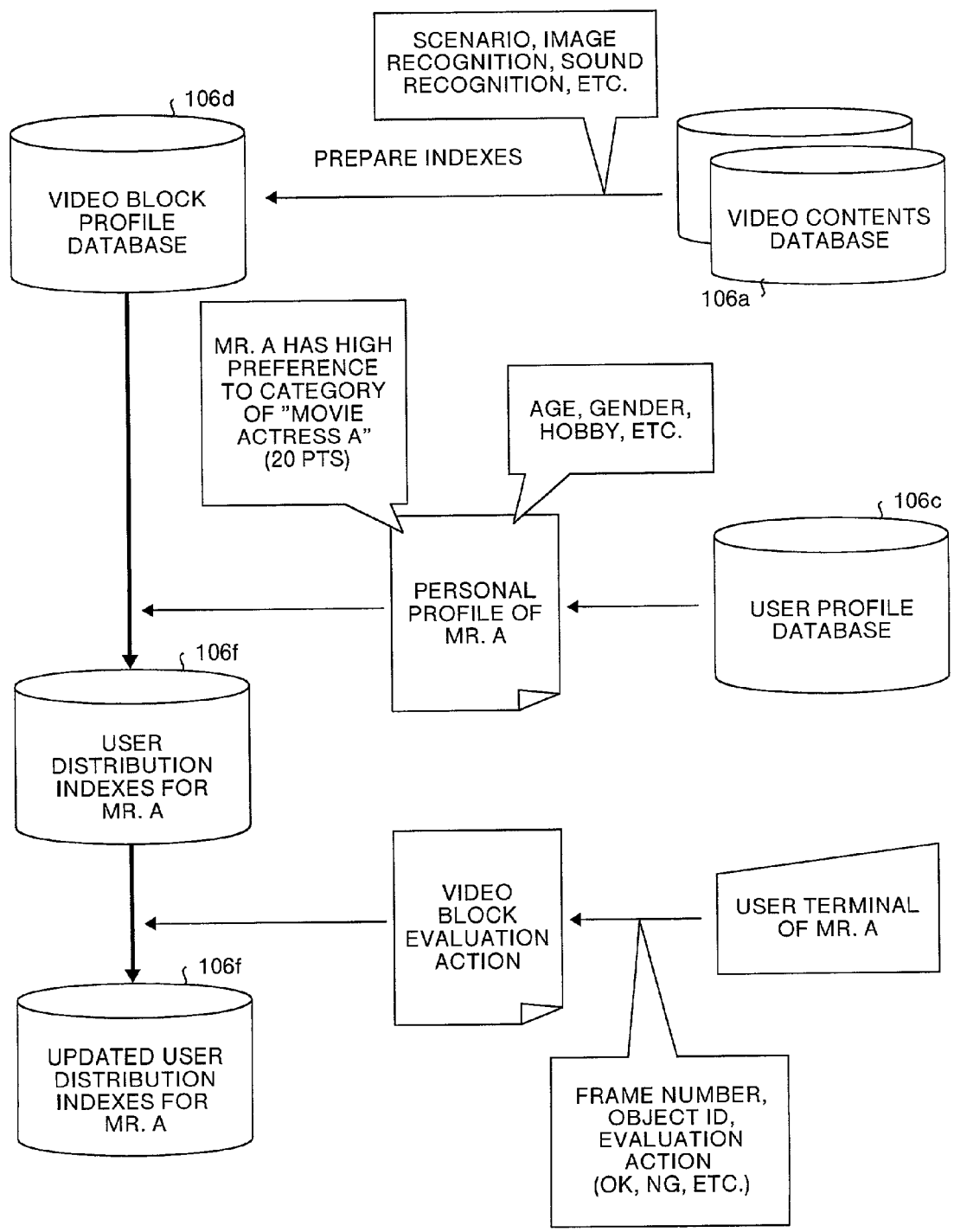
FIG. 13 is a conceptional diagram that shows the outline of a user distribution index preparation processing.

FIG. 13 is a conceptional diagram that shows the outline of a user distribution index preparation processing. FIG. 14 is a conceptional diagram that shows one example of the contents of user distribution indexes.

Figure 14:
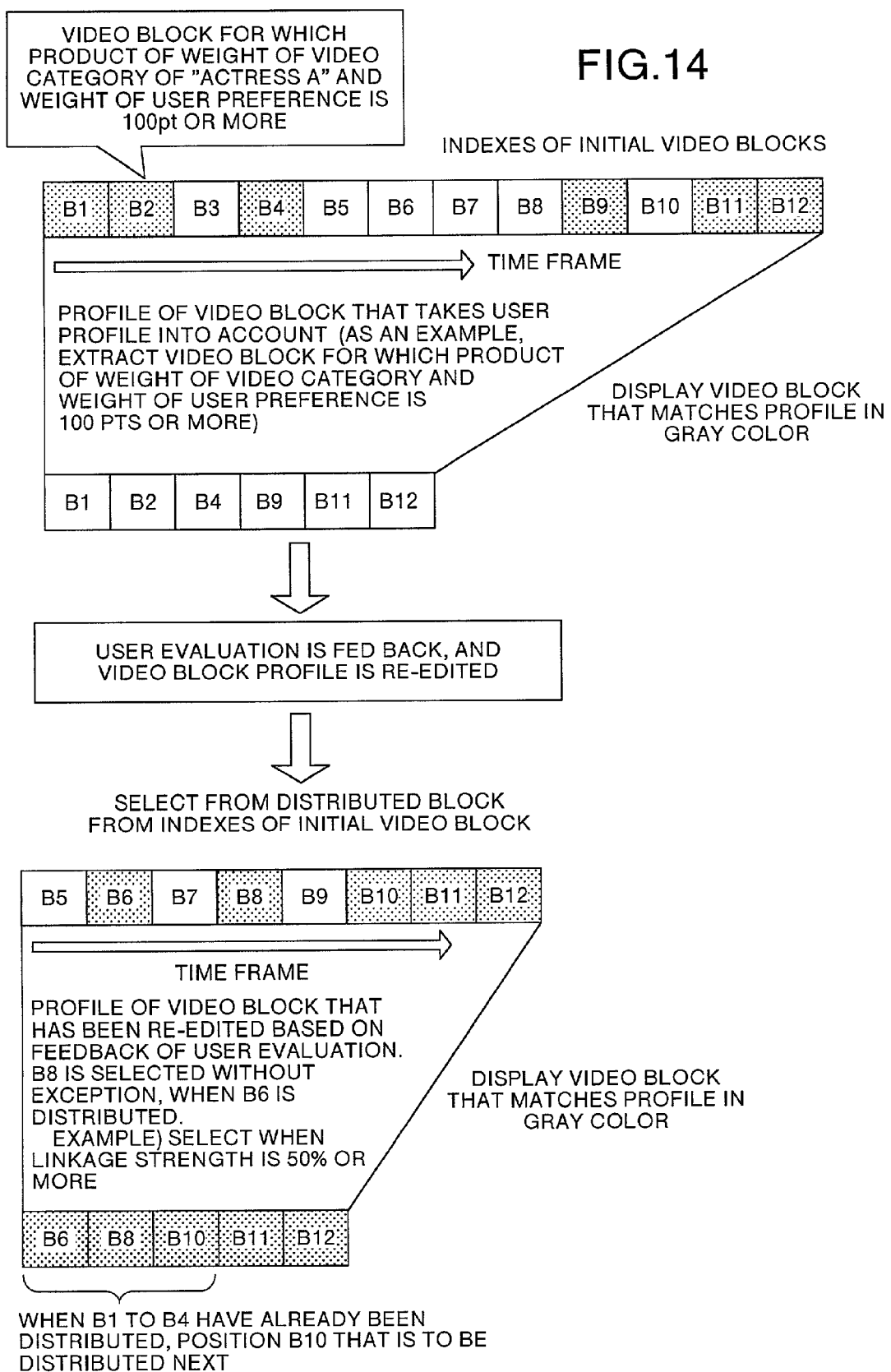
FIG. 14 is a conceptional diagram that shows one example of the contents of user distribution indexes.

As shown in FIG. 14, when a product of the weight information of the video category of a video block in the video block profile and the weight information of the video category of preference information in the user profile has exceeded a constant threshold value, for example, the distribution processing section 102b may extract this video block.

On example of a method of determining whether the video block is to be distributed or not will be explained in detail next.

Assume that there is a certain category a. Weight information of a video category of the preference information of a certain user is expressed as Fa, Weight information of a numerical value of the video category a is expressed as Ma. A threshold value of the category a is expressed as Va. In this instance, when the following expression is satisfied, it is regarded that the video block coincides with the preference file.

$$Fa \times Ma \geq Va \qquad (3)$$

In general, as a plurality of categories exist, these categories are expressed as a, b, . . . , and so on. Assume that a threshold value of the category a is expressed as Va, a threshold value of the category b is expressed as Vb, and a total threshold value is expressed as V. In this instance, when any one of the following expressions is satisfied, it is regarded that the profiles coincide with the user preference.

$$Fa \times Ma \geq Va \qquad (4)$$

$$Fb \times Mb \geq Vb \qquad (5)$$

$$Va + Vb + \ldots \geq V \qquad (6)$$

When the condition of the expression (6) is satisfied, it is regarded that the profiles coincide with the user preference, when a total value of the profiles exceeds the total threshold value, even if each profile value does not exceed the corresponding threshold value. Based on this, it becomes possible to handle wide patterns in which the categories as a total match the user preference although a specific category does not match the user preference.

Referring back to FIG. 8, the distribution processing section 102b stores the prepared user distribution indexes in the user distribution index database 106f, and distributes the video contents to the user based on the user distribution indexes. In other words, the distribution processing section 102b extracts the video blocks of the video contents from the video contents database 106a according to the user distribution indexes, and distributes these video blocks to the client unit 200 of the user (step SF-5). Then, the distribution processing finishes.

Figure 9:
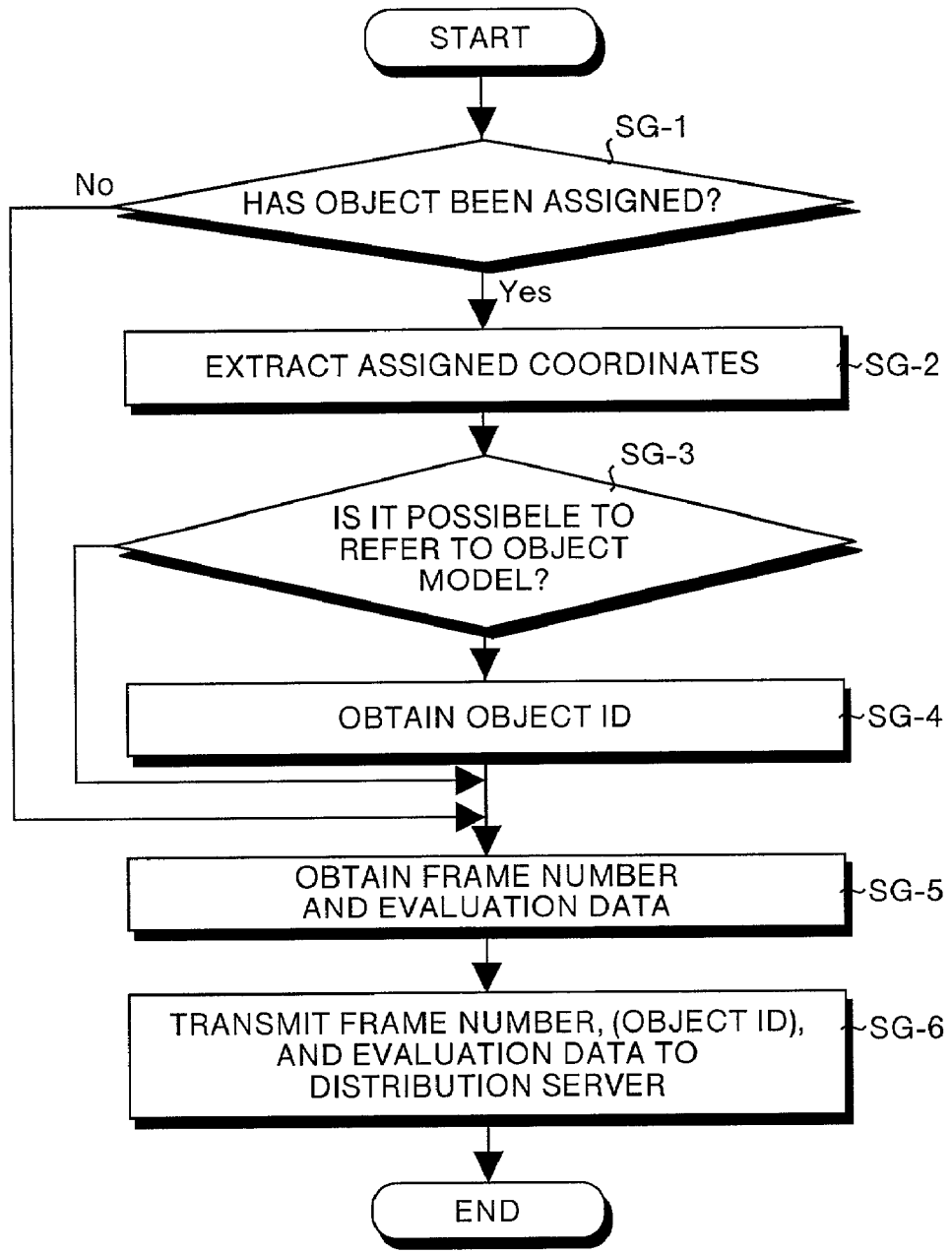
FIG. 9 is a flowchart that shows one example of an evaluation feedback processing of the present system in the embodiment.

The evaluation feedback processing that is executed at step SA-3 in FIG. 3 will be explained in detail with reference to FIG. 9. FIG. 9 is a flowchart that shows one example of the evaluation feedback processing of the present system in the embodiment.

Figure 15:
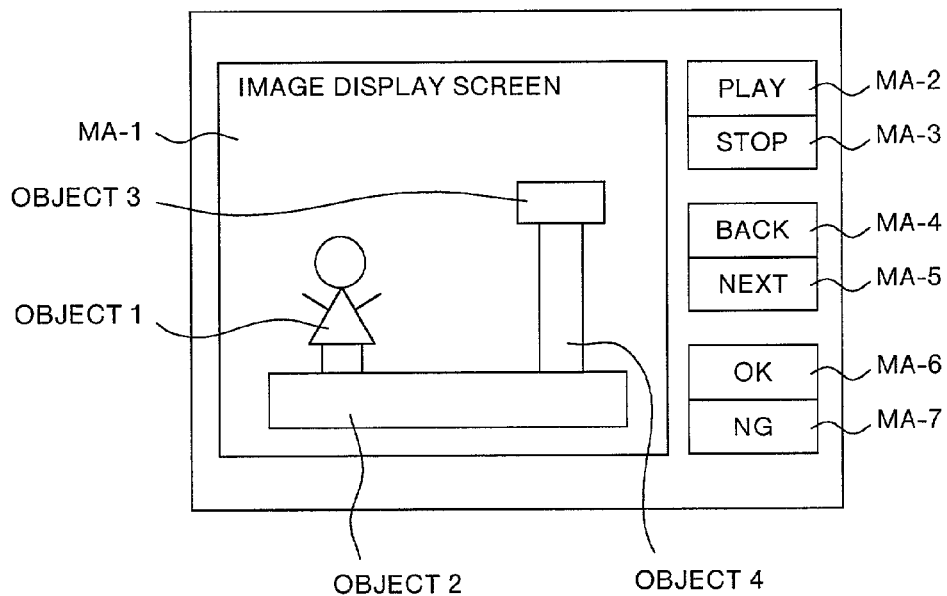
FIG. 15 is a diagram that shows one example of a user terminal screen that is displayed on the monitor of a client unit 200.

When the user client unit 200 has received a data distributed from the information distributing unit 100, the client unit 200 displays a user terminal screen shown in FIG. 15 on the monitor, based on the function of the browser or the like.

FIG. 15 is a diagram that shows one example of a user terminal screen that is displayed on the monitor of the client unit 200. As shown in FIG. 15, the user terminal screen is constructed of a video display area MA-1 in which a video is displayed, a "PLAY" button MA-2 which the user depresses to reproduce a video, a "STOP" button MA-3 which the user depresses to stop a reproduction of a video, a "BACK" button MA-4 which the user depresses to return to the preceding video block, a "NEXT" button MA-5 which the user depresses to proceed to the next video block, an "OK" button MA-6 which the user depresses to make a positive evaluation of a displayed video block, and an "NG" button MA-7 which the user depresses to make a negative evaluation of a displayed video block.

The user's client unit 200 reproduces a transmitted video block on the screen, and carries out an evaluation action. In other words, the "OK" button MA-6 is depressed when the user evaluates the video block as satisfactory. The "NG" button MA-7 is depressed when the user evaluates the video block as unsatisfactory. The "BACK" button MA-4 is depressed when the user wants to look at the video block again. The "NEXT" button MA-5 is depressed when the user wants to skip to the next video block. The user observes the video blocks while making evaluation.

In FIG. 15, four objects of an object 1 to an object 4 are displayed in the vide display area MA-1.

In actual practice, it is not necessary to display each button on the screen, and these functions maybe realized by using buttons installed on a remote controller.

The user assigns an object (a person, an object, or a background) with the mouse, and depresses an evaluation button (the "OK" button MA-6, or the "NG" button MA-7) (step SG-1). Based on this, the client unit 200 specifies the object assigned by the user (specifies a frame number as the object identification information), and transmits the evaluation action (OK/NG) to the information distributing unit 100 (steps SG-2 to step SG-6). Then, the information distributing unit 100 obtains a video category that corresponds to the frame number and the object identification information, based on the processing of the evaluation feedback processing section 102c. Thereafter, the information distributing unit 100 updates the preference point (adds/subtracts the weight information of the video category) based on the evaluation action, in the re-edit distribution processing to be described later.

The object identification information and the video category may not be one to one. Instead, it is also possible to relate a plurality of video categories to one piece of object identification information. For example, it is possible to relate four video categories (movie information/actor/actress/actress A) to an object of an actress A. Further, it is also possible to relate video categories (fashion/accessories/hat).

When the user carries out an evaluation without assigning an object (when the user depresses an evaluation button on the displayed screen) at step SG-1, the client unit 200 transmits a frame number and an evaluation action (OK/NG) that are displayed on the screen to the information distributing unit 100 (step SG-5 to step SG-6). Then, the information distributing unit 100 obtains a video category that corresponds to the frame number, based on the processing of the evaluation feedback processing section 102c. Thereafter, the information distributing unit 100 updates the preference point (weight information) (adds/subtracts the weight information of the video category) based on the evaluation action, in the re-edit distribution processing to be described later. Then, the evaluation feedback processing finishes.

Figure 10:
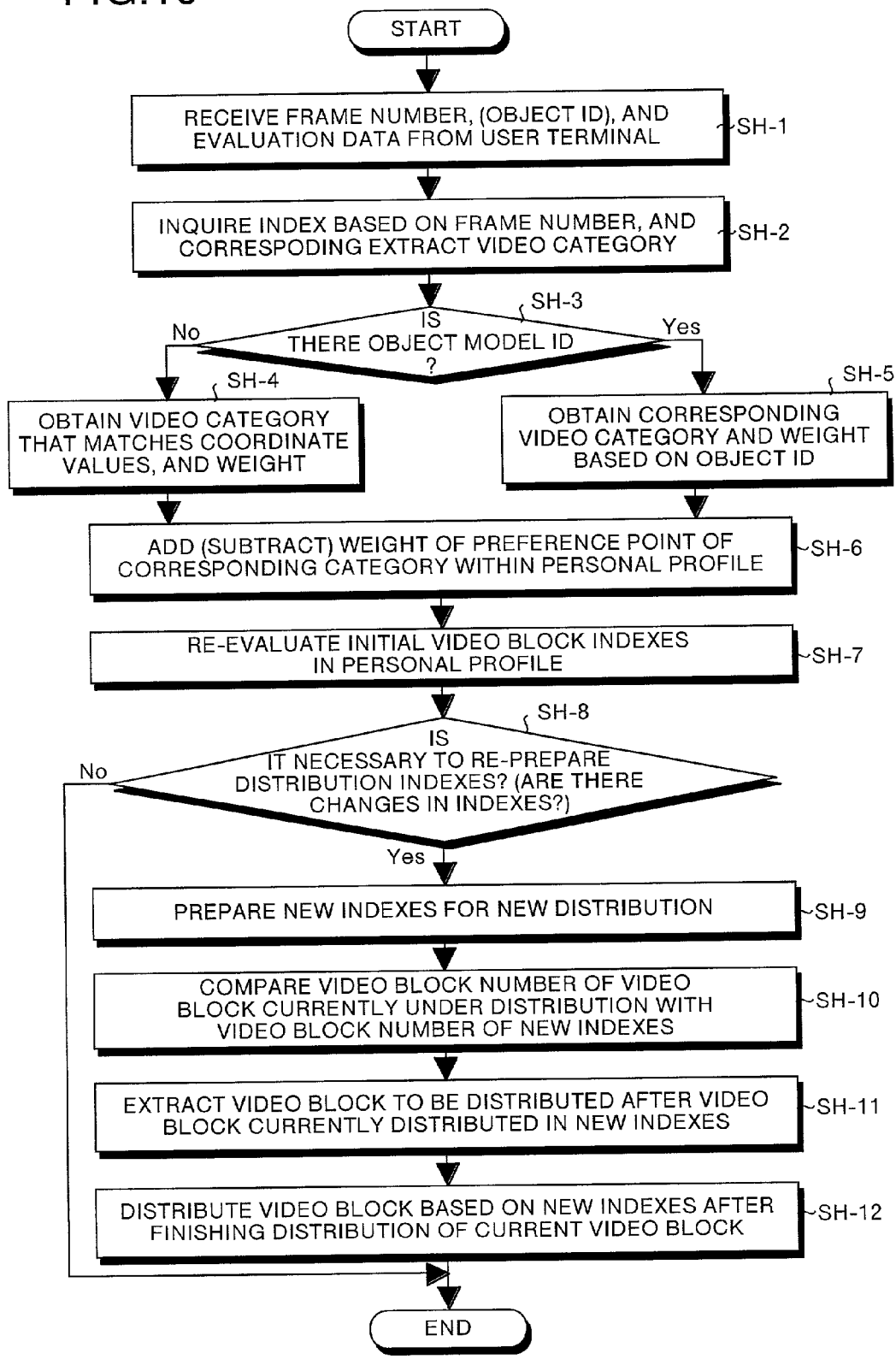
FIG. 10 is a flowchart that shows one example of a re-edit distribution processing of the present system in the embodiment.

The re-edit distribution processing that is executed at step SA-4 in FIG. 3 will be explained in detail next with reference to FIG. 10. FIG. 10 is a flowchart that shows one example of the re-edit distribution processing of the present system in the embodiment.

A plurality of pieces of category information and their weight information are defined as a profile in the video block as explained above. At the time of evaluating the video block, the user assigns a specific object like a person or an object on the screen, and then depresses the OK or NG button. Based on this, it is possible to increase the preference point (weight information) of this specific category information.

There are two methods for this. One method is as follows. When it is possible to refer to an object model as prescribed in the MPEG system, weight information of the category information is added to this object. When the object has been assigned on the screen, the weight information of this object is referred to.

The other method is as follows. When there is no object model, an inquiry is made into video block indexes using a frame number and coordinate points based on the frame number and screen coordinates at the time of the evaluation assignment. Then, features like appearance, style, and clothes of a person are extracted within the video block. Corresponding category information is obtained based on this general recognition method. According to this method, it becomes possible to evaluate the preference of the category information in more detail, based on the assignment of the object.

One example of the instance shown in FIG. 16 will be explained. FIG. 16 shows one example of a classification of user preference and a feedback of preference. FIG. 16 shows a status that video contents categories of a certain field are classified into "movie information/movie actor/actress/Audrey/title of the product", and these categories are stored in the category information database 106g in a structure of a category tree. FIG. 16 also shows that the user preference is weighted in linkage with the categories.

The information distributing unit 100 receives an evaluation data that has been fed back from the user client unit 200, based on the processing of the re-edit distribution processing section 102d (step SH-1). The information distributing unit 100 identifies the category information of the video block (step SH-2), and obtains the evaluation information of the category (for example, a plus weight value when the evaluation is OK, and a minus weight value when the evaluation is NG) (step SH-3 to step SH-5). The information distributing unit 100 carries out weighting in the user preference table (step SH-6).

In this instance, it is possible to increase the preference point of the same category by adding preference points to low-order to high-order categories at the same time. For example, when the point of the title of the product increased by five points, the weight of the actress Audrey as high-order category information increases by three points.

As explained above, the category information has a tree structure, and certain category information has one or a plurality of pieces of low-order category information. Therefore, a relatively large weight is placed on the lower-order category information when viewed from the certain category information. Based on the following calculation expression, a ratio of the weight of the low-order categories to the weight of the high-order categories is obtained. By multiplying this ratio to the weight, the point of the weight information is automatically added to (or subtracted from) the high-order category information.

Figure 18:
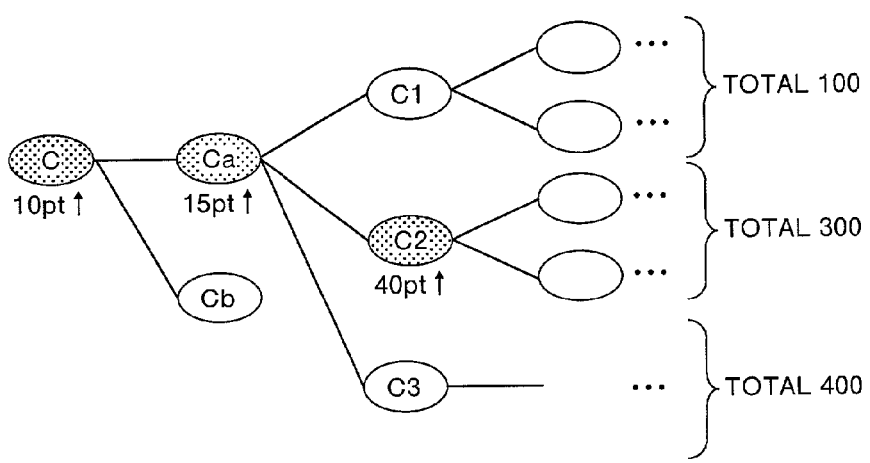
FIG. 18 is a conceptional diagram that explains the concept of increasing preference points (weight information) of high-order category information in the object model.

FIG. 18 is a conceptual diagram that explains the concept of increasing preference points (weight information) of high-order category information in the object model.

Assume that there are C1, C2 and C3 as low-order category information of certain category information Ca. When total numbers of categories under C1, C2 and C3 are assumed as 100, 300, and 400, a constituent ratio based on the total numbers becomes 1:3:4. When the point of C2 has increased by 40 points, the point of C increases by 15 points, based on the following equation.

$$40 \times 3/(1+3+4)=15 \tag{7}$$

Assume that there is a high-order category C at the upstream of Ca, and a constituent ratio of Ca to Cb is 2:1. In this instance, the point of Ca increases by 10 points, based on the following expression.

$$15 \times 2/(2+1)=10 \tag{8}$$

As shown in FIG. 13 and FIG. 14, the information distributing unit 100 changes the weight of the user profile stored in the user profile database 106c according to the evaluation data fed back from the user, based on the processing of the re-edit distribution processing section 102d. The information distributing unit 100 recalculates the threshold value to match the video block profile with the profile file (step SH-7). When re-editing has become necessary (step SH-8), the information distributing unit 100 re-edits the user distribution indexes of a video block that is scheduled to be distributed anew (step SH-9). The information distributing unit 100 compares the indexes of the video block that has already been distributed with the newly prepared indexes (step SH-10), and prepares a video block to be distributed according to the new indexes (step SH-11) Then, the information distributing unit 100 distributes the video block (step SH-12).

The re-edit distribution processing section 102d may cache the fed back evaluation information, and collectively reflect the preference points of the evaluation information to the user profile database 106c at a point of time when the distribution processing has been completed.

As explained above, according to the present invention, video contents are handled as part video blocks, and a video block profile that becomes a searching key is added to the video block. The video block is restructured according to the user profile, and this restructured video block is distributed. Based on this arrangement, it is possible to provide the user with the video contents that match the user profile (preference). Further, even during a distribution of the video contents, it is possible to distribute the video contents by dynamically changing the contents in the form that the user evaluation has been fed back to the video contents. Consequently, it is possible to solve problems of contents distribution by meeting various preferences.

It is also possible to select advertising information corresponding to the video block profile, and insert advertising of a product that becomes a target according to the distribution contents.

In the instance of distributing a video block while matching the user preference with the category information profile in real time, the problem of shortage in the video block to be distributed occurs, when there is no distribution block or there is a small number of matching blocks. However, when there is a small number of blocks that match the user preference, it is possible to distribute a block by using threshold values for the preference matching, based on the feedback of evaluation from the user, in the distribution based on the distribution indexes.

It is possible to expect a large advertising effect when an advertising is inserted between video blocks that match the advertising profile, in the instance of inserting the advertising into a video block that is scheduled to be distributed. The information distributing unit 100 may carry out a matching between the basic information or preference information of the user profile and the attribute information of the advertising information that is stored in the advertising information database 106e. The information distributing unit 100 may transmit the advertising information that matches, when the video contents are distributed to the user. At this stage, the re-edit distribution processing finishes.

A first embodiment of the present invention will be explained below.

In the first embodiment, a KARAOKE video distribution will be taken up as an example. Video contents are distributed according to a profile (preference) of a specific user. The distribution is carried out while feeding back a user action.

Assume that video block moving-picture data of a plurality of KARAOKE backgrounds are stored in the video contents database 106a by using key frames as starting frames.

The information distributing unit 100 prepares a video block profile for these video blocks by using a scenario data or an object model according to an image recognition/sound recognition method, based on the processing of the initial edit processing section 102a. The information distributing unit 100 prepares the video block profile database 106d for the video contents.

The initial edit processing section 102a assigns in advance category information of the video contents and users to whom the video contents are to be carried out for each category. The initial edit processing section 102a stores these pieces of information in the category information database 106g in advance.

When a user who has the client unit 200 (a KARAOKE terminal) has made a request which distributes a video that is suitable for the profile, the distribution processing section 102b refers to the user profile (age, gender, preference, etc.) of the user in the user profile database 106c, and prepares user distribution indexes that are suitable for this user. When there is no user profile at the distribution origin, the distribution processing section 102b prepares a user profile based on a simple questionnaire, and stores the prepared user profile in the user profile database 106c.

For example, when there is a user profile that the user wants to look at a digest scene of a movie in which the actress A appears as a KARAOKE background screen, the distribution processing section 102b refers to the video block profile database 106d, and extracts a video block that corresponds to this user profile from the video block profile. The distribution processing section 102b automatically generates indexes in the layout along a time axis, and prepares user distribution indexes of this user.

The distribution processing section 102b transmits the prepared user distribution indexes to a distribution server (a relay GW). The distribution server sequentially takes out corresponding video blocks from the moving-picture data of the video contents database 106a, according to the indexes, and distributes the video blocks to the user.

Assume that one scene of a movie (category information is "actress A/title of product") has been distributed to the user, and the user client unit 200 has made an evaluation action (OK) for this video block. When the evaluation feedback processing section 102c has received the evaluation information, the re-edit distribution processing section 102d obtains the video profile of this video block, and feeds back the evaluation action to this profile. In other words, the re-edit distribution processing section 102d places numerical weight to the preference classification of this user (point increase of the "movie/actress A/title of product" category) based on the video block profile and the evaluation action that have been fed back.

More detail will be provided while referring to FIG. 16 again. FIG. 16 shows one example of a user preference classification and category information in the present embodiment. When an evaluation has been made such that the preference point of the title of the product increases, there are suitable increases in the points of the Audrey category, the actress category, the movie actor category, and the movie information category that are the higher-order categories. Based on this, there are relative increases in the preference points of relevant categories.

Threshold values are re-calculated for the matching between the video block profile of the video block and the profile, based on the fed back evaluation data. When it is necessary to carry out the re-editing, user distribution indexes of a video block that is scheduled to be distributed anew are re-edited.

The user distribution indexes of the video block that has already been distributed and the user distribution indexes of the video block that has been generated anew are compared. A video block that is to be distributed is determined based on this comparison. The video block is distributed to the user based on this determination.

There is another utilization example of user feedback. When the evaluation action of user sound (a match of rhythm and a musical interval) is determined in synchronism with a distributed video block at the user terminal, this video block and its profile are obtained. The video block profile and the evaluation action are fed back to the distribution processing section. For example, when the user sound (musical interval) matches (or does not match) the melody, the evaluation point is fed back to the server. When the evaluation point is high, the server selects the next video block so as to progress the story of the KARAOKE video. On the other hand, when the evaluation point is low, the server selects the same video block. Based on this control, it is possible to dynamically change over the user preference (evaluation action) at the server. In this way, it becomes possible to employ a new utilization method.

While the embodiment of the present invention has been explained above, the present invention is not limited to the above embodiment. It is also possible to implement the present invention in various other different embodiments within the range of the technical idea described in claims of the invention.

It is possible to manually carry out the whole or a part of the above processing that has been explained to be carried out automatically in the above embodiment. It is also possible to automatically carry out the whole or a part of the above processing according to a known method that has been explained to be carried out manually in the above embodiment.

It is possible to optionally change, except where specified otherwise, the information including parameters like processing orders, control orders, detailed names, various registration data, and search conditions, screen examples, and database structures that are shown in the document and drawings.

Various constituent elements of the information distributing unit 100 shown in the drawings show ideas of functions, and it is not always necessary to have physical structures as shown in the drawings.

For example, it is possible to realize the whole or a part of the processing functions of the servers, particularly, the processing function of the control sections of the information distributing unit 100, with a CPU (central processing unit) and programs that are interpreted and executed by the CPU. Alternatively, it is possible to realize these functions as hardware based on a wired logic. The programs are recorded on a recording medium to be described later. The information distributing unit 100 mechanically reads these programs when necessary.

As further constituent elements of the information distributing unit 100, the information distributing unit 100 may include an input unit (not shown) that consists of various kinds of pointing devices like a mouse, a keyboard, an image scanner, and a digitizer, a display unit (not shown) that is used as a monitor of input data, a clock generating section (not shown) that generates system clocks, and an output unit (not shown) such as a printer that outputs various printing results and other data. The input unit, the display unit, and the output unit may be connected to the control section 102 via input/output interfaces respectively.

Various kinds of databases (the video contents database 106a to the category information database 106g) that are stored in the storage section are storing units like memory units such as a RAM and a ROM, a fixed disk unit like a hard disk, a flexible disk, and an optical disk. These storing units store various program, files, databases, and web page files that are used to provide various kinds of processing and web sites.

Peripheral units like a printer, a monitor and an image scanner may be connected to an information processing unit like an information processing terminal such as a known personal computer or a workstation. Then, the information distributing unit 100 may be realized by installing software (including programs and data) that realizes the method of the present invention on this information processing unit.

Detailed modes of distribution and integration of the information distributing unit 100 are not limited to those shown in the drawings. It is also possible to structure the information distributing unit 100 by functionally or physically distributing/integrating the whole or a part of the information distributing unit in optional units according to loads. For example, it is possible to structure each database as an independent database unit. It is also possible to structure a part of each processing by using CGI (common gateway interface).

According to the needs, peripheral units like a printer, a monitor and an image scanner may be connected to an information processing unit like an information processing terminal such as a known personal computer, a workstation, a home game unit, a KARAOKE unit, an Internet TV, a PHS terminal, a portable terminal, a mobile communication terminal, or a PDA. Then, the client unit 200 may be realized by installing software (including programs and data) that realizes the web information browsing function and the electronic mail function on this information processing unit.

It is possible to realize the whole or a part of the control sections of the client unit 200 with a CPU and programs that are interpreted and executed by the CPU. The ROM or the HD is recorded with a computer program that gives instructions to the CPU and carries out various kinds of processing in co-operation with the OS (operating system) This computer program is loaded on the RAM, and is executed. The computer program constitutes the control section in co-operation with the CPU.

However, this computer program may also be recorded on an application program server that is connected to the client unit 200 via an optional network. It is possible to download the whole or a part of this computer program according to the needs. It is also possible to realize the whole or a part of each control section as hardware according to a wired logic.

It is possible to store the computer programs relating to the present invention on a computer-readable recording medium. The "recording medium" includes optional "portable physical mediums" like a floppy disk, an optical magnetic disk, a ROM, an EPROM, an EEPROM, a CD-ROM, an MO, and a DVD, optional "fixed physical mediums" like a ROM, a RAM, and an HD that are incorporated in various kinds of computer systems, and "communication mediums" that hold programs in a short time like a communication line and a carrier wave that are used to transmit programs via a network as represented by a LAN, a WAN, and the Internet.

The "computer program" is a data processing method that is described in an optional language according to an optional description method. The program may be in any format of a source code or a binary code. This computer program is not necessarily structured as one unit. The computer program may have a distributed structure of a plurality of modules or libraries, and a structure that achieves its function in co-operation with a separate program as represented by the OS (operating system). It is possible to use known structures and procedures as detailed structures and procedures of reading the reading medium and the installing method after the reading, in each unit of the embodiment.

The network 300 has a function of connecting between the information distributing unit 100 and the client unit 200. The network 300 may include any one of the Internet, an Intranet, a LAN (including both wired and radio), a VAN, a personal communication network, a public telephone network (including both analog and digital), a private line network (including both analog and digital), a CATV network, a portable line switching network/portable packet switching network according to the IMT2000 system, the GSM system, or the PDC/PDC-P system, a radio calling network, a local radio network like the Bluetooth, a PHS network, and a satellite communication network like the CS, the BS, or the ISDB. In other words, the present system can transmit/receive various kinds of data via an optional network regardless of wired or radio.

As explained above in detail, according to one aspect of the present invention, contents information selected based on profile information of a user is transmitted from a contents information processing device to a information terminal unit. The user is made to input evaluation information relating to the evaluation of the transmitted contents information, in the information terminal unit. The contents information to be distributed to the information terminal unit of the user is changed based on the input evaluation information. Therefore, it is possible to automatically re-edit the contents information according to the user profile information like user preference and the evaluation information, and automatically transmit the re-edited result. Based on this, it is possible to provide a contents distribution method, a contents information processing device, and a program which enable the user to receive information of mainly the contents information in the field of the user's interest.

The user can always transmit evaluation information of the distributed contents information. Based on this, the user can transmit the own preference to the contents information processing device continuously and over the long term. Therefore, it is possible to provide a contents distribution method, a contents information processing device, and a program which enable the user to receive video contents that correspond to changes in the user preference along the lapse of time.

In the mean time, as the contents provider and the advertising provider can understand the latest preferences of users, they can select most suitable users. Therefore, it is possible to provide a contents distribution method, a contents information processing device, and a program which enable the contents provider and the advertising provider carry out more effective and efficient contents distribution and advertising distribution.

According to another aspect of the present invention, the contents information includes at least one video block (a unit of video data that consists of a scene that has a series of meaning). Category information relating to the category of the video block is stored, and weight information of the category information of the video block is stored. Therefore, it is possible to set a suitable profile to the video block.

It is decided whether the video block is to be transmitted to the user information terminal unit or not based on the stored weight information. Therefore, it is possible to transmit only a video block that has weight information that exceeds a constant threshold value, based on the comparison between the weight information of the category information in the user profile and the weight information of the profile of the vide block, for example.

According to still another aspect of the present invention, the user profile information is changed based on the evaluation information. Therefore, the user can always transmit evaluation information of the distributed contents information. Based on this, the user can transmit the own preference to the contents information processing device continuously and over the long term. As a result, the user can receive video contents that correspond to changes in the user preference along the lapse of time.

In the mean time, as the contents provider and the advertising provider can understand the latest preferences of users, they can select most suitable users. Therefore, the contents provider and the advertising provider can carry out more effective and efficient contents distribution and advertising distribution.

According to still another aspect of the present invention, the category information is determined based on at least one of scenario data relating to the scenario of the contents information, video data, and sound data. Therefore, it is possible to automatically provide category information to the video block without manual work.

According to still another aspect of the present invention, the category information is classified into a hierarchy of two or more layers, and when the weight information of the category information of a lower order has been changed, the weight information of the category information of a higher order is also changed. Therefore, it is possible to suitably feed back the changes in the low-order category information to the category information.

According to still another aspect of the present invention, the contents information includes at least one object. The category information and the weight information are set for each object. Further, the system makes the user input the evaluation information relating to the evaluation of the object of the contents information. Therefore, it is possible to efficiently collect user preferences, in the contents information of the object model.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A contents distribution method that is executed by using a contents information management system that is structured based on a connection between a contents information processing device that processes distributed contents information and an information terminal unit of a user via a network such that they can communicate with each other, the contents distribution method comprising:
    transmitting the contents information selected based on profile information of the user, from the contents information processing device to the information terminal unit;
    making the user input evaluation information relating to the evaluation of the contents information that has been transmitted, in the information terminal unit;
    changing the contents information to be distributed to the information terminal unit of the user, based on the evaluation information that has been inputted;
    storing category information relating to the category of the video block;
    storing weight information of the category information of the video block where the weight information is a range of at least three weight points; and
    whether the video block is to be transmitted to the information terminal unit of the user or not, based on the weight information that has been stored; and
    wherein the storing category information further comprises: determining the category information based on at least one of scenario data relating to the scenario of the contents information, video data, and sound data; and
    wherein the category information is weighted automatically in proportion to the prominence of an actor or actress in the scenario, the prominence of the actor comprising the area of ratio of an actor on screen, the actor's position on the screen and the actor's sound volume.

2. The contents distribution method according to claim 1, further comprising:
    changing step of changing the profile information of the user based on the evaluation information.

3. The contents distribution method according to claim 1, wherein the category information is classified into a hierarchy of two or more layers, and when the weight information of the category information of a lower order has been changed, the weight information of the category information of a higher order is also changed.

4. The contents distribution method according to claim 1, wherein
    the contents information includes at least one object,
    the category information and the weight information are set for each object, and
    the making the user input evaluation information makes the user input the evaluation information relating to the evaluation of the object of the contents information that has been transmitted.

5. A contents information processing device that is connected to an information terminal unit of a user via a network, and that processes contents information that is distributed to the information terminal unit, the contents information processing device comprising:
    a contents information transmitting unit that transmits the contents information selected based on profile information of the user, to the information terminal unit;
    an evaluation information receiving unit that receives from the information terminal unit, evaluation information relating to the user evaluation of the contents information that has been transmitted by the contents information transmitting unit;
    a contents information changing unit that changes the contents information to be distributed to the information terminal unit of the user, based on the evaluation information that has been received by the evaluation information receiving unit;
    a category information storing unit that stores category information relating to the category of the video block;
    a weight information storing unit that stores weight information of the category information of the video block where the weight information is a range of at least three weight points; and
    a transmission decision unit that decides whether the video block is to be transmitted to the information terminal unit of the user or not, based on the weight information that has been stored by the weight information storing unit;
    wherein the category information storing unit comprises:
    a category information determination unit that determines the category information based on at least one of scenario data relating to the scenario of the contents information, video data, and sound data; and
    wherein the category information is weighted automatically in proportion to the prominence of an actor or actress in the scenario, the prominence of the actor comprising the area of ratio of an actor on screen, the actor's position on the screen and the actor's sound volume.

6. The contents information processing device according to claim 5, further comprising: a user profile information changing unit that changes the profile information of the user based on the evaluation information.

7. The contents information processing device according to claim 5, wherein the category information is classified into a hierarchy of two or more layers, and when the weight information of the category information of a lower order has been changed, the weight information of the category information of a higher order is also changed.

8. The contents information processing device according to claim 5, wherein
    the contents information includes at least one object,
    the category information and the weight information are set for each object, and
    the evaluation information input unit makes the user input the evaluation information relating to the evaluation of the object of the contents information that has been transmitted by the contents information transmission unit.

9. A computer-readable physical recording medium that stores therein a computer program that makes a contents information processing device execute a contents information processing method, the contents information processing device being connected to an information terminal unit of a user via a network and processing contents information that is distributed to the information terminal unit, the computer-readable physical recording medium that stores therein the computer program making a computer execute:

transmitting the contents information selected based on profile information of the user, to the information terminal unit;

receiving from the information terminal unit, evaluation information relating to the user evaluation of the contents information that has been transmitted; and changing the contents information to be distributed to the information terminal unit of the user, based on the evaluation information that has been received;

storing category information relating to the category of the video block;

storing weight information of the category information of the video block where the weight information is a range of at least three weight points; and deciding whether the video block is to be transmitted to the information terminal unit of the user or not, based on the weight information that has been stored, wherein the storing category information further comprises: determining the category information based on at least one of scenario data relating to the scenario of the contents information, video data, and sound data; and wherein the category information is weighted automatically in proportion to the prominence of an actor or actress in the scenario, the prominence of the actor comprising the area of ratio of an actor on screen, the actor's position on the screen and the actor's sound volume.

10. The computer-readable physical recording medium according to claim 9, further making the computer execute changing the profile information of the user based on the evaluation information.

11. The computer-readable physical recording medium according to claim 9 wherein the category information is classified into a hierarchy of two or more layers, and when the weight information of the category information of a lower order has been changed, the weight information of the category information of a higher order is also changed.

12. The computer-readable physical recording medium according to claim 9, wherein the contents information includes at least one object, the category information and the weight information are set for each object, and the receiving from the information terminal unit makes the user input the evaluation information relating to the evaluation of the object of the contents information that has been transmitted at the transmitting the contents information.

13. A contents distribution method that is executed by using a contents information management system that is structured based on a connection between a contents information processing device that processes distributed contents information and an information terminal unit of a user via a network such that they can communicate with each other, the contents distribution method comprising:

a contents information transmission of transmitting the contents information selected based on profile information of the user, from the contents information processing device to the information terminal unit;

an evaluation information input step of making the user input evaluation information relating to the evaluation of the contents information that has been transmitted at the contents information transmission step, in the information terminal unit;

a contents information changing step of changing the contents information to be distributed to the information terminal unit of the user, based on the evaluation information that has been input at the evaluation information input step;

a category information storing step of storing category information relating to the category of the video block;

a weight information storing step of storing weight information of the category information of the video block; and a transmission decision step of deciding whether the video block is to be transmitted to the information terminal unit of the user or not, based on the weight information that has been stored at the weight information storing step; and wherein the category information storing step comprises a category information determination step that determines the category information based on at least one of scenario data relating to the scenario of the contents information, video data, and sound data;

wherein the category information is weighted automatically in proportion to the prominence of an actor or actress in the scenario; and wherein said prominence is related to a role of an actor or actress, a classification of a scene, a ratio of an area on a screen, and a sound volume.

14. A contents information processing device that is connected to an information terminal unit of a user via a network, and that processes contents information that is distributed to the information terminal unit, the contents information processing device comprising:

a contents information transmitting unit that transmits the contents information selected based on profile information of the user, to the information terminal unit;

an evaluation information receiving unit that receives from the information terminal unit, evaluation information relating to the user evaluation of the contents information that has been transmitted by the contents information transmitting unit;

a contents information changing unit that changes the contents information to be distributed to the information terminal unit of the user, based on the evaluation information that has been received by the evaluation information receiving unit;

a category information storing unit that stores category information relating to the category of the video block;

a weight information storing unit that stores weight information of the category information of the video block; and a transmission decision unit that decides whether the video block is to be transmitted to the information terminal unit of the user or not, based on the weight information that has been stored by the weight information storing unit;

wherein the category information storing unit comprises:

a category information determination unit that determines the category information based on at least one of scenario data relating to the scenario of the contents information, video data, and sound data;

wherein the category information is weighted automatically in proportion to the prominence of an actor or actress in the scenario; and wherein said prominence is related to a role of an actor or actress, a classification of a scene, a ratio of an area on a screen, and a sound volume.

15. A computer-readable physical recording medium that stores therein a computer program that makes a contents information processing device execute a contents information processing method, the contents information processing device being connected to an information terminal unit of a user via a network and processing contents information that is distributed to the information terminal unit, the computer-readable physical recording medium that stores therein the computer program making a computer execute:

a contents information transmission step of transmitting the contents information selected based on profile information of the user, to the information terminal unit;

an evaluation information receiving step of receiving from the information terminal unit, evaluation information relating to the user evaluation of the contents information that has been transmitted at the contents information transmission step; and a contents information changing step of changing the contents information to be distributed to the information terminal unit of the user, based on the evaluation information that has been received at the evaluation information receiving step;

a category information storing step of storing category information relating to the category of the video block;

a weight information storing step of storing weight information of the category information of the video block; and a transmission decision step of deciding whether the video block is to be transmitted to the information terminal unit of the user or not, based on the weight information that has been stored at the weight information storing step, wherein the category information storing step comprises a category information determination step that determines the category information based on at least one of scenario data relating to the scenario of the contents information, video data, and sound data;

wherein the category information is weighted automatically in proportion to the prominence of an actor or actress in the scenario; and wherein said prominence is related to a role of an actor or actress, a classification of a scene, a ratio of an area on a screen, and a sound volume.

* * * * *

UNITED STATES PATENT AND TRADEMARK OFFICE
CERTIFICATE OF CORRECTION

PATENT NO. : 7,281,054 B2
APPLICATION NO. : 10/095083
DATED : October 9, 2007
INVENTOR(S) : Taisuke Ishioka et al.

It is certified that error appears in the above-identified patent and that said Letters Patent is hereby corrected as shown below:

Column 21, Line 57, before "changing" delete "changing step of".

Signed and Sealed this

First Day of April, 2008

JON W. DUDAS
*Director of the United States Patent and Trademark Office*